United States Patent
Adcock et al.

(10) Patent No.: US 7,873,544 B2
(45) Date of Patent: Jan. 18, 2011

(54) ANTI-INTERNALIZATION ORDER MODIFIER

(75) Inventors: Paul D. Adcock, Burr Ridge, IL (US); Michael A. Cormack, Evanston, IL (US); Thomas F. Haller, Longwood, IL (US); Robert A. Hill, LaGrange, IL (US)

(73) Assignee: Archipelago Holdings, Inc., Chicago, IL (US)

( * ) Notice: Subject to any disclaimer, the term of this patent is extended or adjusted under 35 U.S.C. 154(b) by 435 days.

(21) Appl. No.: 11/416,710

(22) Filed: May 3, 2006

(65) Prior Publication Data
US 2006/0253378 A1 Nov. 9, 2006

Related U.S. Application Data

(60) Provisional application No. 60/678,022, filed on May 5, 2005.

(51) Int. Cl.
*G06Q 40/00* (2006.01)
(52) U.S. Cl. .......................................... 705/26; 705/35
(58) Field of Classification Search ............. 705/35–36, 705/26
See application file for complete search history.

(56) References Cited

U.S. PATENT DOCUMENTS

| | | | |
|---|---|---|---|
| 5,101,353 A | 3/1992 | Lupien et al. |
| 5,560,580 A | 10/1996 | Almoslino |
| 5,845,266 A | 12/1998 | Lupien et al. |
| 5,905,974 A | 5/1999 | Fraser et al. |
| 5,950,176 A | 9/1999 | Keiser et al. |
| 6,012,046 A | 1/2000 | Lupien et al. |
| 6,098,051 A | 8/2000 | Lupien et al. |
| 6,278,982 B1 | 8/2001 | Korhammer et al. |
| 6,343,278 B1 | 1/2002 | Jain et al. |
| 6,377,940 B2 | 4/2002 | Tilfors et al. |
| 6,405,180 B2 | 6/2002 | Tilfors et al. |
| 6,408,282 B1 | 6/2002 | Buist |
| 6,505,174 B1 | 1/2003 | Keiser et al. |
| 6,615,188 B1 | 9/2003 | Breen et al. |
| 6,618,707 B1 | 9/2003 | Gary |
| 6,714,948 B1 | 3/2004 | Richards |
| 6,829,589 B1 | 12/2004 | Saliba |
| 6,832,210 B1 | 12/2004 | Li |
| 6,850,907 B2 | 2/2005 | Lutnick et al. |
| 6,963,856 B2 | 11/2005 | Lutnick et al. |
| 6,983,260 B2 | 1/2006 | Hummelgren |

(Continued)

FOREIGN PATENT DOCUMENTS

AU  2006/244479  11/2006

(Continued)

OTHER PUBLICATIONS

Lee W. Young, "International Search Report", Aug. 9, 2007, 6 pages.

(Continued)

*Primary Examiner*—Thu Thao Havan
(74) *Attorney, Agent, or Firm*—Milbank Tweed Hadley & McCloy LLP (57) ABSTRACT

An anti-internalization order modifier and related market center and process are disclosed which prevent orders sent from the same trading firm from executing against one another on the posting market center the orders are posted on.

26 Claims, 3 Drawing Sheets

U.S. PATENT DOCUMENTS

| | | | |
|---|---|---|---|
| 7,162,448 | B2 | 1/2007 | Madoff et al. |
| 7,184,982 | B1 | 2/2007 | Howorka et al. |
| 7,197,483 | B2 | 3/2007 | Brady et al. |
| 7,209,896 | B1 | 4/2007 | Serkin et al. |
| 7,225,153 | B2 | 5/2007 | Lange |
| 7,242,669 | B2 | 7/2007 | Bundy et al. |
| 7,246,090 | B1 | 7/2007 | Thomas |
| 7,246,093 | B1 | 7/2007 | Katz |
| 7,249,086 | B2 | 7/2007 | Bloom et al. |
| 7,356,498 | B2 | 4/2008 | Kaminsky et al. |
| 7,383,220 | B1 | 6/2008 | Keith |
| 7,401,046 | B2 | 7/2008 | Hollerman, et al. |
| 7,685,057 | B2 | 10/2008 | Chiulli et al. |
| 7,467,110 | B2 | 12/2008 | Muller et al. |
| 2001/0037284 | A1 | 11/2001 | Finkelstein et al. |
| 2002/0010672 | A1* | 1/2002 | Waelbroeck et al. ......... 705/37 |
| 2002/0010673 | A1 | 1/2002 | Muller et al. |
| 2002/0019795 | A1 | 2/2002 | Madoff et al. |
| 2002/0019799 | A1 | 2/2002 | Ginsberg et al. |
| 2002/0042765 | A1 | 4/2002 | Dawson |
| 2002/0062273 | A1 | 5/2002 | Perkel et al. |
| 2002/0082979 | A1 | 6/2002 | Sands et al. |
| 2002/0091617 | A1 | 7/2002 | Keith |
| 2002/0091621 | A1 | 7/2002 | Conklin et al. |
| 2002/0120511 | A1 | 8/2002 | Hanes |
| 2002/0128951 | A1 | 9/2002 | Kiron et al. |
| 2002/0128955 | A1 | 9/2002 | Brady et al. |
| 2002/0128958 | A1 | 9/2002 | Slone |
| 2002/0143676 | A1 | 10/2002 | Kiron et al. |
| 2002/0147670 | A1 | 10/2002 | Lange |
| 2002/0161687 | A1 | 10/2002 | Serkin et al. |
| 2002/0169703 | A1 | 11/2002 | Lutnick et al. |
| 2002/0184135 | A1 | 12/2002 | Zakaria |
| 2002/0184136 | A1 | 12/2002 | Cleary |
| 2002/0198815 | A1 | 12/2002 | Greifeld et al. |
| 2002/0198816 | A1 | 12/2002 | Gilbert et al. |
| 2003/0004851 | A2 | 1/2003 | Kiron et al. |
| 2003/0004858 | A1 | 1/2003 | Schmitz et al. |
| 2003/0009400 | A2 | 1/2003 | Kiron et al. |
| 2003/0009412 | A1 | 1/2003 | Furbush et al. |
| 2003/0009413 | A1 | 1/2003 | Furbush et al. |
| 2003/0009414 | A1 | 1/2003 | Furbush et al. |
| 2003/0014351 | A1 | 1/2003 | Neff et al. |
| 2003/0023536 | A1 | 1/2003 | Hollerman et al. |
| 2003/0040955 | A1 | 2/2003 | Anaya et al. |
| 2003/0041006 | A1 | 2/2003 | Bunda |
| 2003/0083974 | A1 | 5/2003 | Bunda |
| 2003/0093343 | A1 | 5/2003 | Huttenlocher et al. |
| 2003/0097328 | A1 | 5/2003 | Lundberg et al. |
| 2003/0115131 | A1 | 6/2003 | Heaton et al. |
| 2003/0130920 | A1 | 7/2003 | Freund |
| 2003/0130925 | A1 | 7/2003 | Malitzis |
| 2003/0130926 | A1 | 7/2003 | Moore et al. |
| 2003/0135443 | A1 | 7/2003 | Moore et al. |
| 2003/0139998 | A1 | 7/2003 | Gilbert et al. |
| 2003/0172024 | A1* | 9/2003 | Kokis et al. ................... 705/37 |
| 2003/0177082 | A1 | 9/2003 | Buckwalter |
| 2003/0191703 | A1 | 10/2003 | Chen et al. |
| 2003/0216932 | A1 | 11/2003 | Foley |
| 2003/0229557 | A1 | 12/2003 | Richmann et al. |
| 2003/0233307 | A1 | 12/2003 | Salvadori et al. |
| 2004/0030630 | A1 | 2/2004 | Tilfors et al. |
| 2004/0044610 | A1 | 3/2004 | Fraser et al. |
| 2004/0059666 | A1 | 3/2004 | Waelbroeck et al. |
| 2004/0088242 | A1 | 5/2004 | Ascher et al. |
| 2004/0143538 | A1 | 7/2004 | Korhammer et al. |
| 2004/0143542 | A1 | 7/2004 | Magill et al. |
| 2004/0177024 | A1 | 9/2004 | Bok et al. |
| 2004/0177026 | A1 | 9/2004 | Ballabon |
| 2004/0210508 | A1 | 10/2004 | Bohnenberger |
| 2004/0210511 | A1 | 10/2004 | Waelbroeck et al. |
| 2004/0215538 | A1 | 10/2004 | Smith et al. |
| 2004/0225592 | A1 | 11/2004 | Churquina |
| 2004/0236662 | A1 | 11/2004 | Korhammer et al. |
| 2004/0236669 | A1 | 11/2004 | Horst et al. |
| 2004/0243502 | A1 | 12/2004 | Slowik et al. |
| 2004/0254804 | A1 | 12/2004 | Peterffy et al. |
| 2004/0254877 | A1 | 12/2004 | Buckwalter et al. |
| 2004/0267655 | A1 | 12/2004 | Davidowitz et al. |
| 2005/0010481 | A1 | 1/2005 | Lutnick et al. |
| 2005/0075963 | A1 | 4/2005 | Balabon |
| 2005/0096999 | A1 | 5/2005 | Newell et al. |
| 2005/0119964 | A1 | 6/2005 | Brady et al. |
| 2005/0125316 | A1 | 6/2005 | Levering et al. |
| 2005/0137962 | A1 | 6/2005 | Penney et al. |
| 2005/0160024 | A1 | 7/2005 | Soderborg et al. |
| 2005/0171887 | A1 | 8/2005 | Daley et al. |
| 2005/0171888 | A1 | 8/2005 | Daley et al. |
| 2005/0171889 | A1 | 8/2005 | Daley et al. |
| 2005/0171890 | A1 | 8/2005 | Daley et al. |
| 2005/0171891 | A1 | 8/2005 | Daley et al. |
| 2005/0171895 | A1 | 8/2005 | Howorka et al. |
| 2005/0197916 | A1 | 9/2005 | Newell et al. |
| 2005/0222936 | A1 | 10/2005 | Panariti et al. |
| 2005/0228739 | A1 | 10/2005 | Leibowitz |
| 2005/0240510 | A1 | 10/2005 | Schweickert et al. |
| 2005/0273407 | A1 | 12/2005 | Black et al. |
| 2005/0273408 | A1 | 12/2005 | Bandman et al. |
| 2005/0273419 | A1 | 12/2005 | Ogg et al. |
| 2005/0283415 | A1 | 12/2005 | Studnitzer et al. |
| 2005/0283421 | A1 | 12/2005 | Hatheway et al. |
| 2005/0283426 | A1 | 12/2005 | Krishnasami et al. |
| 2005/0283427 | A1 | 12/2005 | Owens et al. |
| 2006/0020536 | A1 | 1/2006 | Renfon et al. |
| 2006/0031157 | A1 | 2/2006 | Gianakouros et al. |
| 2006/0089898 | A1 | 4/2006 | Durkin et al. |
| 2006/0089899 | A1 | 4/2006 | Durkin et al. |
| 2006/0136318 | A1 | 6/2006 | Rafieyan et al. |
| 2006/0136326 | A1 | 6/2006 | Heckman et al. |
| 2006/0149659 | A1 | 7/2006 | Carone et al. |
| 2006/0161494 | A1 | 7/2006 | Littlewood |
| 2006/0184444 | A1 | 8/2006 | McConaughy et al. |
| 2006/0206404 | A1 | 9/2006 | Hatheway et al. |
| 2006/0206407 | A1 | 9/2006 | Troxel et al. |
| 2006/0235786 | A1 | 10/2006 | DiSalvo |
| 2006/0253374 | A1 | 11/2006 | Addock et al. |
| 2006/0259391 | A1 | 11/2006 | Schoen et al. |
| 2006/0277137 | A1 | 12/2006 | Claus et al. |
| 2006/0277138 | A1 | 12/2006 | Ross et al. |
| 2007/0022041 | A1 | 1/2007 | Durkin et al. |
| 2007/0043647 | A1 | 2/2007 | Bickford |
| 2007/0055607 | A1 | 3/2007 | Wunsch et al. |
| 2007/0078753 | A1 | 4/2007 | Cormack et al. |
| 2007/0112693 | A1 | 5/2007 | Cushing |
| 2007/0198391 | A1 | 8/2007 | Dreyer et al. |
| 2007/0244792 | A1 | 10/2007 | Couperier et al. |
| 2008/0040290 | A1 | 2/2008 | Harris |
| 2010/0030704 | A1 | 2/2010 | Griffin et al. |

FOREIGN PATENT DOCUMENTS

| | | |
|---|---|---|
| AU | 2006/244483 | 11/2006 |
| AU | 2006/244499 | 11/2006 |
| AU | 2006/244562 | 11/2006 |
| AU | 2006/244563 | 11/2006 |
| AU | 2006/244564 | 11/2006 |
| AU | 2006/244566 | 11/2006 |
| EP | 1321870 A1 | 6/2003 |
| JP | 2008/510109 | 11/2008 |
| JP | 2008/510110 | 11/2008 |
| JP | 2008/510226 | 11/2008 |
| JP | 2008/510238 | 11/2008 |
| SG | 2007/166754 | 11/2007 |
| SG | 2007/166770 | 11/2007 |

| | | |
|---|---|---|
| SG | 2007/166788 | 11/2007 |
| SG | 2007/166796 | 11/2007 |
| SG | 2007/166804 | 11/2007 |
| SG | 2007/166812 | 11/2007 |
| SG | 2007/166762 | 12/2007 |
| WO | WO 02/07039 | 2/2001 |
| WO | WO 01/22322 | 3/2001 |
| WO | WO 01/22339 | 3/2001 |
| WO | WO 01/52166 | 7/2001 |
| WO | WO 01/75733 | 10/2001 |
| WO | WO 01/90925 | 11/2001 |
| WO | WO 02/09008 | 1/2002 |
| WO | WO 2004/008296 | 1/2004 |
| WO | WO 2005/010790 | 2/2005 |
| WO | WO 2005/036354 | 4/2005 |
| WO | PCTUS2006016683 | 11/2006 |
| WO | PCTUS2006016684 | 11/2006 |
| WO | PCTUS2006016685 | 11/2006 |
| WO | PCTUS2006016701 | 11/2006 |
| WO | PCTUS2006017249 | 11/2006 |
| WO | PCTUS2006017253 | 11/2006 |
| WO | PCTUS2006017296 | 11/2006 |
| WO | PCTUS2006036461 | 4/2007 |
| WO | PCTUS2006036878 | 4/2007 |
| WO | PCTUS2007016572 | 1/2008 |
| WO | PCTUS2007016682 | 1/2008 |
| WO | PCTUS2007016856 | 1/2008 |
| WO | PCTUS2007016857 | 1/2008 |
| WO | PCTUS2007016718 | 2/2008 |
| WO | PCTUS2007016571 | 3/2008 |
| WO | PCTUS2007024921 | 6/2008 |

OTHER PUBLICATIONS

International Search Report & Written Opinion, PCT/US07/16856, Nov. 10, 2008.
International Search Report for PCT/US06/16685, Sep. 17, 2007.
International Preliminary Report on Patentability, PCT/US2007/016572, Apr. 23, 2009.
International Preliminary Report on Patentability, PCT/US2007/024921, Jun. 18, 2009.
McKinnion, Julie M., Toldeo Ohio-Based Dana Corp. Could Lose NYSE Listing in Takeover Battle, The Blade, Aug. 3, 2003.
Young, Lee, W., International Search Report May 18, 2007, 4 pages.
Young, Lee, W., International Search Report Sep. 12, 2007, 6 pages.
International Search Report, Mar. 20, 2008 for PCT/US2007/016718.
Young, Lee, W., International Search Report Aug. 29, 2007, 7 pages.
Young, Lee, W., International Search Report Sep. 5, 2007, 8 pages.
Young, Lee, W., International Search Report Sep. 7, 2007, 5 pages.
Young, Lee, W., International Search Report Sep. 29, 2007, 6 pages.
Australian Patent Office Written Opinion & Search Report, mailed Dec. 1, 2008.
Australian Patent Office Written Opinion & Search Report, mailed Jan. 9, 2009.
Australian Patent Office Written Opinion & Search Report, mailed Feb. 13, 2009.
Austrian Patent Office Search Report and Written Opinion, mailed Mar. 6, 2009.
Austrian Patent Office Search Report and Written Opinion, mailed Mar. 13, 2009.
Notice of Allowance and Examiner's Amendment for U.S. Appl. No. 11/345,420.
Phlx Allows Floor Broker Crossing, Wall Street Letter, New York, Feb. 24, 2003, p. 1.
Anonymous, Rising tide lifts all boats in institutional equities, The Investment Dealers' digest: IDD, New York, Mar. 28, 1994, vol. 60, Iss. 13, p. 16, 5 pages.
Headstrong Buys assets of Elind Software Provider; Noticiasfinancieras, Miami Nov. 1, 2004, p. 1.
Non-Final Rejection, Feb. 26, 2008.
Response to Non-Final, Aug. 29, 2008 for U.S. Appl. No. 11/122,689.
Final Rejection, Nov. 18, 2008 for U.S. Appl. No. 11/122,689.
Response to Final, Mar. 17, 2009 for U.S. Appl. No. 11/122,689.
Examiner Interview, Apr. 13, 2009 for U.S. Appl. No. 11/122,689.
Non-Final Rejection, Apr. 27, 2009 for U.S. Appl. No. 11/122,689.
Non-Final Rejection, Apr. 1, 2008 for U.S. Appl. No. 11/122,679.
Response to Non-Final, Oct. 6, 2008 for U.S. Appl. No. 11/122,679.
Non-Final Rejection, Jan. 5, 2009 for U.S. Appl. No. 11/122,679.
Response to Non-Final, Apr. 6, 2009 for U.S. Appl. No. 11/122,679.
Examiner Interview, May 4, 2009 for U.S. Appl. No. 11/122,679.
Response to Non-Final, Jun. 17, 2009 for U.S. Appl. No. 11/122,679.
Non-Final Rejection, Dec. 9, 2008 for U.S. Appl. No. 11/345,420.
Response to Non-Final, Mar. 16, 2009 for U.S. Appl. No. 11/345,420.
Notice of Allowance, Jul. 23, 2009 for U.S. Appl. No. 11/345,420.
Non-Final Rejection, Feb. 12, 2008 for U.S. Appl. No. 11/122,498.
Response to Non-Final, Aug. 14, 2008 for U.S. Appl. No. 11/122,498.
Final Rejection, Sep. 19, 2008 for U.S. Appl. No. 11/122,498.
Response to Final, Jan. 9, 2009 for U.S. Appl. No. 11/122,498.
Non-Final Rejection, Apr. 15, 2009 for U.S. Appl. No. 11/122,498.
Non-Final Rejection, Jun. 27, 2008 for U.S. Appl. No. 11/345,421.
Response to Non-Final, Sep. 22, 2008 for U.S. Appl. No. 11/345,421.
Final Rejection, Jan. 26, 2009 for U.S. Appl. No. 11/345,421.
Response to Final, May 22, 2009 for U.S. Appl. No. 11/345,421.
Non-Final Rejection, Sep. 30, 2008 for U.S. Appl. No. 11/416,942.
Response to Non-Final, Jan. 12, 2009 for U.S. Appl. No. 11/416,942.
Final Rejection, Apr. 23, 2009 for U.S. Appl. No. 11/416,942.
International Search Report, Jul. 2, 2008 for PCT/US2007/016572.
International Search Report, Sep. 5, 2008 for PCT/US2007/016857.
International Search Report, Jun. 17, 2008 for PCT/US2007/016571.
International Search Report, Jun. 17, 2008 for PCT/US2007/016682.
International Search Report, Sep. 18, 2008 for PCT/US2007/016856.
International Search Report, Nov. 10, 2008 for PCT/US2007/016856.
Non-Final Rejection, Dec. 29, 2008 for U.S. Appl. No. 11/416,913.
Response to Non-Final, Mar. 25, 2009 for U.S. Appl. No. 11/416,913.
Final Rejection, Aug. 3, 2009 for U.S. Appl. No. 11/416,913.
Restriction Requirement, Mar. 27, 2009 for U.S. Appl. No. 11/416,756.
Response to Non-Final, Apr. 27, 2009 for U.S. Appl. No. 11/416,756.
Non-Final Rejection, Aug. 4, 2009 for U.S. Appl. No. 11/416,756.
Non-Final Rejection, Sep. 3, 2008 for U.S. Appl. No. 11/416,943.
Response to Non-Final, Dec. 5, 2008 for U.S. Appl. No. 11/416,943.
Final Rejection, Mar. 17, 2009 for U.S. Appl. No. 11/416,943.
Response to Final, Jun. 17, 2009 for U.S. Appl. No. 11/416,943.
Non-Final Rejection, May 19, 2009 for U.S. Appl. No. 11/525,363.
International Search Report, Jun. 17, 2008 for PCT/US2006/036461.
Non-Final Rejection, Sep. 15, 2008 for U.S. Appl. No. 11/527,797.
Response to Non-Final, Dec. 15, 2008 for U.S. Appl. No. 11/527,797.
Final Rejection, Mar. 30, 2009 for U.S. Appl. No. 11/527,797.
Response to Final, May 19, 2009 for U.S. Appl. No. 11/527,797.
Non-Final Rejection, Nov. 12, 2008 for U.S. Appl. No. 11/634,020.
Response to Non-Final, Feb. 17, 2009 for U.S. Appl. No. 11/634,020.
Non-Final Rejection, Jun. 24, 2009 for U.S. Appl. No. 11/634,020.
International Search Report, May 12, 2008 for PCT/US2007/024921.
Examiner Interview Summary Record, Aug. 18, 2009 for U.S. Appl. No. 11/122,689.
Response to Nonfinal, Aug. 27, 2009 for U.S. Appl. No. 11/122,689.
Notice of Allowance, Aug. 21, 2009 for U.S. Appl. No. 11/122,679.
Examiner Interview Summary Record, Sep. 9, 2009 for U.S. Appl. No. 11/122,679.
Examiner Interview Summary Record, Aug. 18, 2009 for U.S. Appl. No. 11/122,498.
Response to Nonfinal, Sep. 15, 2009 for U.S. Appl. No. 11/122,498.
Response to Final, Sep. 30, 2009 for U.S. Appl. No. 11/416,942.
Examiner Interview Summary Record, Mar. 31, 2009 for U.S. Appl. No. 11/416,943.
Nonfinal Rejection, Sep. 30, 2009 for U.S. Appl. No. 11/416,943.
NASDAQ Launches Liquidity Tracker, HighBeam Research, Dec. 5, 2002.
Response to Nonfinal, Sep. 29, 2009 for U.S. Appl. No. 11/634,020.
Response to Final, Oct. 19, 2009 for U.S. Appl. No. 11/416,913.
International Search Report, Oct. 14, 2009 for SG2007166754.

International Search Report, Oct. 2, 2009 for SG2007166812.
A Taxonomy of Automated Trade Execution Systems, Ian Domowitz, Journal of International Money and Finance, (1993), 12, pp. 607-631.
U.S. Appl. No. 61/191,055, filed Oct. 28, 2008, Neuner et al.
U.S. Appl. No. 11/881,788, filed Jun. 18, 2009, Adcock, et al.
U.S. Appl. No. 11/881,789, filed Sep. 18, 2009, Adcock, et al.
U.S. Appl. No. 60/721,165, filed Sep. 28, 2005 Drake, et al.
U.S. Appl. No. 11/122,679, filed May 5, 2005 Adcock, et al.
U.S. Appl. No. 11/122,689, filed Jul. 27, 2010, Adcock, et al.
U.S. Appl. No. 11/345,420, filed Nov. 9, 2006, Adcock, et al.
U.S. Appl. No. 11/880,852, filed May 14, 2009, Armstrong, et al.
U.S. Appl. No. 11/880,686, filed Jan. 29, 2009, Haller, et al.
U.S. Appl. No. 11/122,498, filed May 5, 2005 Brill, et al.
U.S. Appl. No. 11/345,421, filed Nov. 9, 2009, Adcock, et al.
U.S. Appl. No. 11/880,840, filed Mar. 12, 2009, Adcock, et al.
U.S. Appl. No. 11/634,020, filed Jun. 5, 2008, Jimenez, et al.
U.S. Appl. No. 11/527,797, filed Mar. 29, 2007, Drake, et al.
U.S. Appl. No. 11/416,942, filed Nov. 9, 2006, Adcock, et al.
U.S. Appl. No. 11/525,363, filed Apr. 5, 2007, Cormack et al.
U.S. Appl. No. 11/416,943, filed Nov. 9, 2006, Adcock, et al.
U.S. Appl. No. 11/416,756, filed Nov. 9, 2006, Adcock, et al.
U.S. Appl. No. 11/881,064, filed Sep. 18, 2008, Adcock, et al.
U.S. Appl. No. 11/416,913, filed Nov. 9, 2006, Adcock, et al.
Roger D. Huang et al., Tick Size, Bid-Ask Spreads and Market Structure, Working Paper 99-05 Version: Feb. 8, 2001; Forthcoming Journal of Financial and Quant. Analysis 1-29.
Bart Frijns et al., Price discovery in tick time, Journal of Empirical Financial, vol. 16, Issue 5, Dec. 2009, pp. 759-776.
Tseng, K.C., Supermontage as a New Trading System of NASDAQ, Investment Management and Financial Innovations, Mar. 2005.
Schnitzlein, Charles R., Call and Continuous Trading Mechanisms Under Asymmetric Information: An Experimental Investigation, The Journal of Finance, vol. 51, No. 2, pp. 613-663.
Dec. 14, 2009 Notice of Allowance for U.S. Appl. No. 11/122,689.
Jan. 6, 2010 Notice of Allowance for U.S. Appl. No. 11/122,689.
Mar. 1, 2010 Notice of Allowance for U.S. Appl. No. 11/122,689.
Jan. 15, 2010 Notice of Allowance for U.S. Appl. No. 11/122,679.
Nov. 16, 2009 Notice of Allowance for U.S. Appl. No. 11/345,420.
Jan. 21, 2010 Examiner Interview U.S. Appl. No. 11/122,498.
Jan. 21, 2010 Final Rejection for U.S. Appl. No. 11/122,498.
Oct. 7, 2009 Nonfinal Rejection for U.S. Appl. No. 11/345,421.
Nov. 23, 2009 Response to Nonfinal for U.S. Appl. No. 11/345,421.
Apr. 2, 2010 Notice of Allowance for U.S. Appl. No. 11/345,421.
Oct. 7, 2009 Response to Final for U.S. Appl. No. 11/416,942.
Oct. 14, 2009 Examiner Interview for U.S. Appl. No. 11/416,942.
Dec. 29, 2009 Notice of Allowance for U.S. Appl. No. 11/416,942.
Jan. 26, 2010 Notice of Allowance for U.S. Appl. No. 11/416,942.
Feb. 24, 2010 Notice of Allowance for U.S. Appl. No. 11/416,942.
Jan. 22, 2010 Nonfinal Rejection for U.S. Appl. No. 11/416,913.
Nov. 4, 2009 Response to Nonfinal for U.S. Appl. No. 11/416,756.
Dec. 14, 2009 Response to Nonfinal for U.S. Appl. No. 11/416,943.
Mar. 23, 2010 Nonfinal Rejection for U.S. Appl. No. 11/416,943.
Nov. 16, 2009 Response to Nonfinal for U.S. Appl. No. 11/525,363.
Aug. 12, 2009 Nonfinal Rejection for U.S. Appl. No. 11/527,797.
Nov. 17, 2009 Response to Nonfinal for U.S. Appl. No. 11/527,797.
Jan. 26, 2010 Final Rejection for U.S. Appl. No. 11/527,797.
Dec. 28, 2009 Final Rejection for U.S. Appl. No. 11/634,020.
Mar. 17, 2010 Response to Final for U.S. Appl. No. 11/634,020.
Nov. 6, 2009 Nonfinal Rejection for U.S. Appl. No. 11/880,686.
Dec. 1, 2009 Nonfinal Rejection for U.S. Appl. No. 11/881,789.
Mar. 19, 2010 Response to Nonfinal for U.S. Appl. No. 11/881,789.
Aug. 16, 2010 Notice of Allowance for U.S. Appl. No. 11/122,679.
Jul. 22, 2009 EIC3600 Search Report for U.S. Appl. No. 11/122,679.
Jul. 2, 2009 EIC3600 Search Report for U.S. Appl. No. 11/345,420.
Jul. 1, 2010 Notice of Allowance for U.S. Appl. No. 11/122,498.
Aug. 4, 2010 Notice of Allowance for U.S. Appl. No. 11/345,421.
Jan. 30, 2009 Austrian Patent Office Search Report and Written Opinion, for SG 200716681-2.
Jul. 6, 2010 Proposed Examiner's Amendment, for U.S. Appl. No. 11/525,363.
Aug. 3, 2010 Notice of Abandonment, for U.S. Appl. No. 11/527,797.
Jul. 28, 2010 Response to Office Action, for U.S. Appl. No. 11/634,020.
Jul. 6, 2010 Nonfinal rejection, for U.S. Appl. No. 11/880,840.
Jul. 21, 2010 Final Office Action, for U.S. Appl. No. 11/880,686.
Aug. 18, 2010 Final Rejection, for U.S. Appl. No. 11/880,852.
Jun. 30, 2010 Nonfinal Rejection, for U.S. Appl. No. 11/881,064.
Aug. 20, 2010 Restrict Requirement, for U.S. Appl. No. 11/881,789.
Jun. 29, 2010 Nonfinal Rejection, for U.S. Appl. No. 11/881,788.
Aug. 26, 2010 Final Rejection, for U.S. Appl. No. 11/416,943.
Aug. 31, 2010 Notice of Allowance, for U.S. Appl. No. 11/122,498.
Sep. 7, 2010, Notice of Allowance, for U.S. Appl. No. 11/345,420.
U.S. Appl. No. 12/807,338, filed Sep. 2, 2010, Adcock, et al.
John Hintze, Direct Order Decision Polarizes Exchanges, Security Industry News, Jun. 13, 2005, Securities Data Publishing.
Peter Chapman, Special Feature: Fragmented Dealing Under Fire, Traders, May 1, 2000, Securities Data Publishing.
Sep. 14, 2010 Notice of Allowance, for U.S. Appl. No. 11/122,498.
Sep. 20, 2010 Notice of Allowance, for U.S. Appl. No. 11/416,942.
Sep. 15, 2010 Final Rejection, for U.S. Appl. No. 11/416,913.
Sep. 24, 2010 Notice of Allowance, for U.S. Appl. No. 11/525,363.
Sep. 2, 2010 Response to Restriction Requirement, for U.S. Appl. No. 11/881,789.
Sep. 29, 2010 Response to Non-final, for U.S. Appl. No. 11/881,788.

* cited by examiner

ANTI-INTERNALIZATION ORDER MODIFIER

CROSS-REFERENCE TO RELATED APPLICATIONS

This application claims priority from and claims the benefit of U.S. Provisional Application No. 60/678,022, filed May 5, 2005, entitled "Anti-Internalization Order Modifier", which is hereby incorporated by reference.

BACKGROUND

The term "internalization" originally referred to the practice of filling a customer's order out of a firm's own inventory rather than sending it to the wider marketplace for price improvement. Because a firm can make money on the difference between the buying price and selling price and there is potential for abuse, this practice is generally frowned upon by regulatory bodies and investor watchdog groups.

Over time, however, the term "internalization" has broadened to such an extent that in some circles the term "internalization" includes any type of trade where a dealer participates. The types of trades involved in internalization matches are usually large block trades that are transacted off-exchange (e.g., "upstairs") because firms feel they are better able to handle the risk involved in committing the significant capital required.

The internalization of orders has long been a controversial topic. In 2000, the SEC undertook a study of the effect of internalization on the execution quality of customer orders and invited market participants to comment on the subject. Detractors claimed that the practice harms investors by overcharging them and reduces market liquidity and transparency since the orders are never exposed to the public markets for competition. Proponents claimed that internalization actually benefits investors because it allows firms to fill their customer orders quickly before the market moves away from their exposed order price.

Some market centers claim that they prevent internalization by exposing orders to the marketplace first for price improvement. However, the period of exposure has declined significantly (e.g., from 30 seconds to 3 seconds on some markets) over the past years. Furthermore, with the increased reliance on electronic routing capabilities, firms can also find themselves in the situation where even though they did not explicitly internalize a customer order at the firm, it is nevertheless subsequently matched with another order from the firm. This can occur when the firm routes buy orders and sell orders for the same issue to the same market center for execution, even if it does not route them at the same time. Although this after-the-fact pairing does not constitute internalization per se, because the orders were not coupled prior to being routed, it can nevertheless be a concern for firms that are sensitive about avoiding even an appearance of impropriety. Since the execution quality of brokerage firms is ranked by financial services research organizations according to criteria that includes whether orders are internalized or not, some firms may choose to not trade with their own orders at all, even if the execution occurs automatically without human intervention on another market center.

Accordingly, there is a need for a method of tagging orders on a posting market center so they do not execute against contra side orders from the same firm.

SUMMARY

According to an aspect of the present invention, a method for preventing orders posted on a market center by a trading firm from executing against contra side orders sent by the same trading firm, which includes providing a market center order book having orders posted thereon, wherein the orders posted on the market center order book each have a trading firm identifier. Furthermore, such posted orders may also carry an anti-internalization tag identifying them as anti-internalization orders. Furthermore, the market center receives an incoming order having a trading firm identifier, and optionally an anti-internalization tag as well, and retrieves the best contra-side order from the market center order book if the incoming order is marketable. Wherein if the incoming order is marketable against the retrieved contra-side order, the method determines if the incoming order and the retrieved contra-side order have the same trading firm identifier. Wherein if the incoming order and the retrieved contra-side order do have the same trading firm identifier and one of the two orders is an anti-internalization order, the method cancels the anti-internalization order. Wherein if both orders are anti-internalization orders, then the method cancels the order with the most recent timestamp.

DESCRIPTION OF THE DRAWINGS

These and other features, aspects and advantages of the present invention will become better understood with regard to the following description, appended claims and accompanying drawings where:

DETAILED DESCRIPTION

Figure 1:
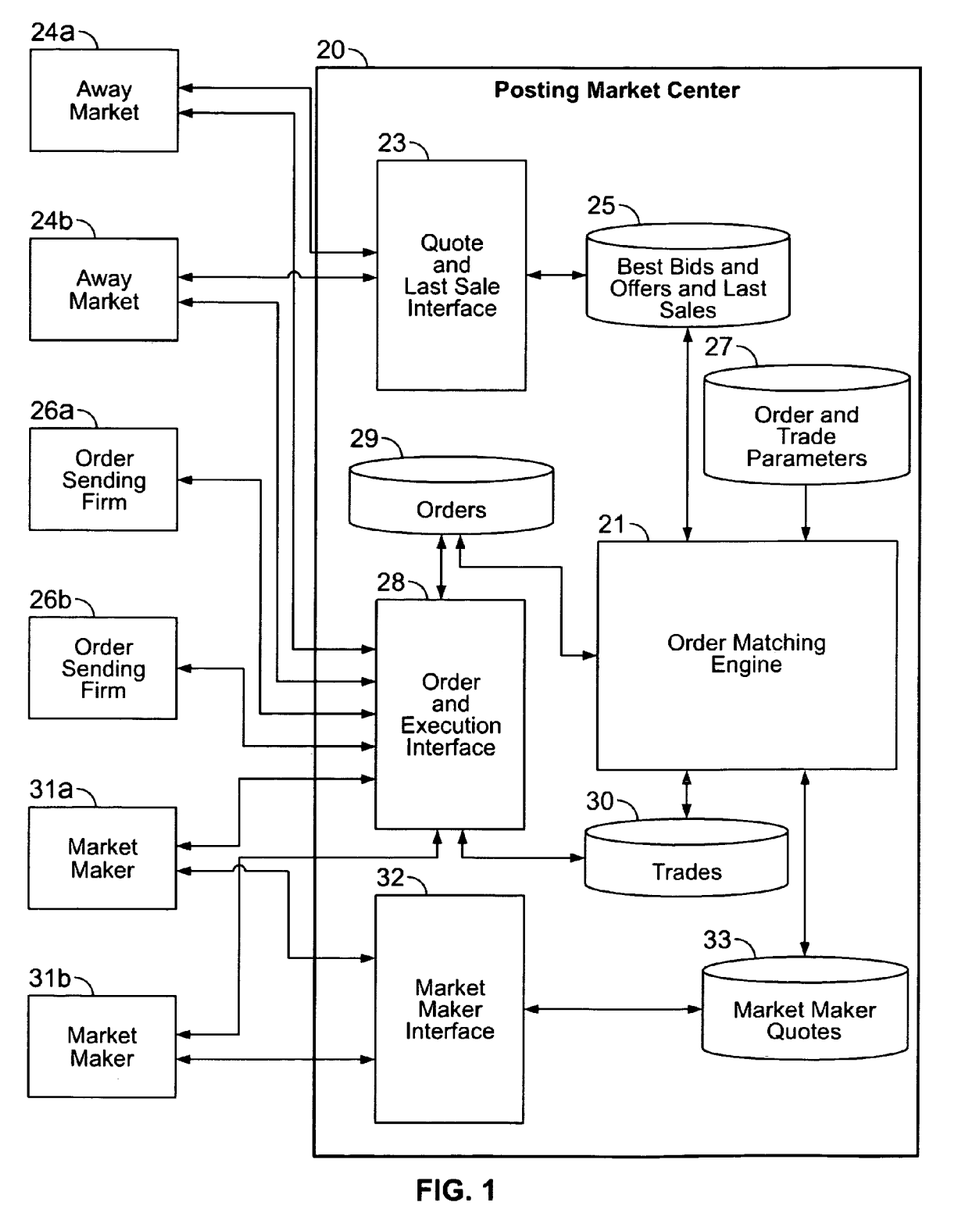
FIG. 1 is a block diagram illustrating the trading environment in which an embodiment of the present invention operates.

Referring to FIG. 1, a trading environment in which an embodiment of the system and method of the present invention operates is depicted. The examples discussed herein primarily describe the use and application of the present invention in an equity security market center environment, but it should be understood that the present invention could be used in any type of financial instrument market center environment (e.g., equities, futures, options, bonds, etc.). The trading environment of this embodiment includes a posting market center 20 which interacts with a number of other market centers 24 (i.e. away markets) traders at order sending firms 26 and Market Makers 31. It should be understood that the trading environment of this embodiment supports but does not require Market Makers 31, a Market Maker Interface 32, or Market Maker Quotes 33. It should also be understood that the posting market center 20 referred to herein refers to a computing system having sufficient processing and memory capabilities and does not refer to a specific physical location. In fact, in certain embodiments, the computing system may be distributed over several physical locations. It should also be understood that any number of traders 26 or Market Makers 31 or away market centers 24 can interact with the posting market center 20. The posting market center 20 is the market center on which a specific trader at an order sending firm 26 posts a specific order, and on which a specific Market Maker 31 posts a specific quote. The posting market center 20 includes an order matching engine 21, which validates, matches and processes all orders and quotes on the posting market center 20. In this embodiment, the code for the order matching engine 21 is stored in the posting market center's memory.

The posting market center 20 may also include a quote and last sale interface 23 that interacts with the away market centers 24 to capture quote and last sale information. This information is stored to a best bids and offers and last sales data structure 25. This data structure 25 is where the market best bid and offer information is stored. This data structure 25 is also where the market trade reports (prints) are stored. The posting market center 20 may also include an order and trade parameters data structure 27. The order and trade parameters data structure 27 stores pre-defined trading parameters and rules that are used by the order matching engine 21 in matching orders and executing trades. The posting market center 20 may also include an order and execution interface 28 which interacts with the traders 26, the Market Makers 31, the away market centers 24 and the order matching engine 21 in the order execution process. The posting market center 20 may also include an order information data structure 29 where order information is stored and a trade information data structure 30 where completed trade information is stored. The posting market center 20 may also include a Market Maker interface 32 that interacts with Market Makers 31 to capture Market Maker bids and offers in assigned issues. These bids and offers are logically depicted in a Market Maker Quotes structure 33 in this illustration. In actuality, the Market Maker bids and offers may physically reside in the away market center best bids and offers data structure 25.

Throughout the discussion herein, it should be understood that the details regarding the operating environment, data structures, and other technological elements surrounding the posting market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Determining which Order to Cancel when an Incoming Order and/or a Resting Order Carries an Anti-Internalization Flag When the order matching engine 21 attempts to match an incoming order with a resting order on the book, it must ensure that neither order carries an Anti-Internalization Flag. It is possible that the resting order does not carry the Anti-Internalization Flag ("AI Flag"), but the incoming order does. Alternatively, it is possible that the resting order carries the AI Flag, but the incoming order does not. It is also possible that both the resting order and the incoming order carry the AI Flag. If either or both orders carry the AI Flag, then the order matching engine 21 must cancel one of the two orders to prevent the orders from matching. In this embodiment, the rules for determining which order to cancel are as follows:

If only one of the two orders carries the AI Flag, the process cancels the order with the AI Flag; and If both of the orders carry the AI Flag, the process cancels the order with the most recent system timestamp.

These rules are illustrated in the table shown here:

| Incoming order has AI Flag? | Posted order has AI Flag? | Action |
| --- | --- | --- |
| No | No | Execute orders |
| No | Yes | Cancel Posted order |
| Yes | No | Cancel Incoming order |
| Yes | Yes | Cancel Incoming order |

Setting an Anti-Internalization Flag for an Incoming Order

When an order sending firm (e.g., trader 26a) does not want an order that it sends to a posting market center 20 to interact with another order from the same order sending firm, the order sending firm indicates this intent in the order it sends to the posting market center 20. The posting market center 20 upon receipt of the order sets a flag within the order that notifies the system that this order is not to interact with other orders from the same firm. Other than the internalization restriction, these types of orders trade and execute in the same manner as any other order does.

In another embodiment, if an order sending firm (e.g., trader 26b) has more than one direct connection to the posting market center 20 (e.g., a GUI connection and a FIX connection, or connections from different trading desks of the same firm), then it is possible for the orders to carry a different Firm ID, depending on their connectivity source. For these order sending firms, the posting market center 20 may have a customer gateway automatically assign an overriding shared Firm ID to all orders from the firm, regardless of their connectivity source, so that the matching process described herein can recognize the orders as originating from the same order sending firm (e.g., trader 26b).

An order sending firm may choose to specify that it does not want to internalize orders on a case by case basis, wherein only designated orders carry the anti-internalization tag, as determined by a trader 26. In a different embodiment, an order sending firm may choose to specify on a firm-wide basis that it does not want to internalize any orders, wherein all orders sent by the firm carry the anti-internalization tag. In such an embodiment, the posting market center 20 may have a customer gateway automatically assign the anti-internalization tag to all orders from the order sending firm.

Anti-Internalization Orders and Market Maker Quotes from the Same Firm

If a posting market center also appoints Market Makers in some issues, then anti-internalization rules can also optionally be extended to include a restriction against the execution of anti-internalization orders against Market Maker quotes from the same firm. A firm may send orders to the posting market center 20 as a trader 26. The same firm may also send quotes to the posting market center 20 as a Market Maker 31. In a preferred but not limiting embodiment of this invention, an order sending firm, by assigning the anti-internalization tag to some or all of its orders, may restrict such anti-internalization orders from trading with other orders from the same firm, and may also restrict such anti-internalization orders from trading with Market Maker quotes from the same firm. Examples illustrating this embodiment of the invention are included in this document.

Figure 2:
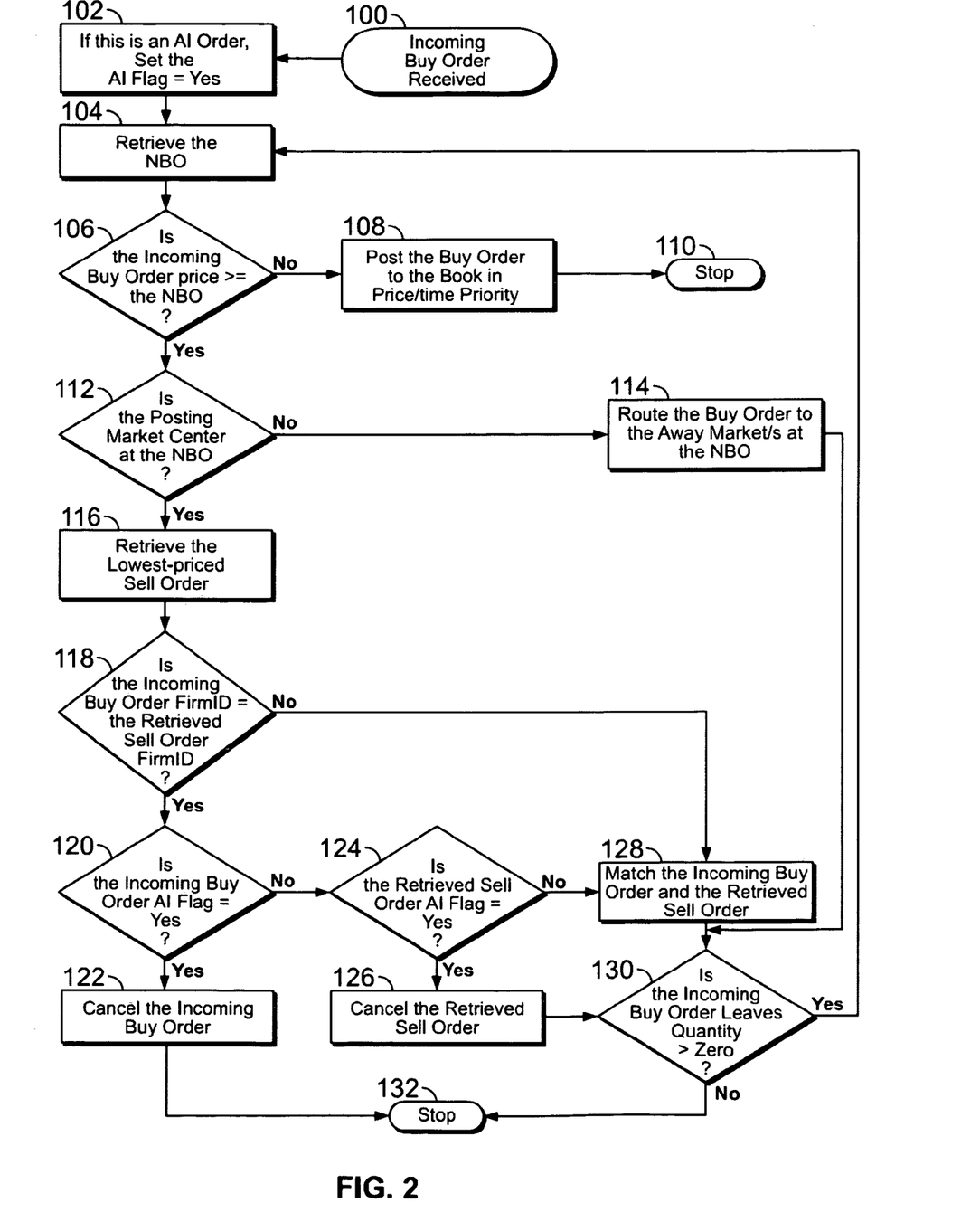
FIG. 2 is a flow diagram illustrating a process implemented by an embodiment of the present invention to process an incoming buy order differently according to whether it is an anti-internalization order or not.

Setting an Anti-Internalization Flag for an Incoming Buy Order and Determining if the Order is Marketable FIG. 2 illustrates the process implemented by the order matching engine 21 where a trader 26 sends a buy order to the posting market center 20. At step 100, a new buy order is received by the order matching engine 21. If the trader 26 does not want this buy order to trade "internally" (i.e., against a sell order from the same firm), then at step 102, the process sets the AI Flag="Yes" on the incoming buy order in accordance with the order sending firm's instructions. Next, the process retrieves the national best offer (NBO) at step 104, for the purpose of determining if the incoming buy order is marketable. At step 106, the process compares the price of the incoming buy order to the NBO. If the price of the incoming buy order is less than the NBO, then the order is not marketable, and the process continues to step 108, where it posts the buy order to the Book in price/time priority. (Alternatively, if the buy order cannot be posted because it must execute immediately, e.g., an 10C order, then the order is canceled instead). Regardless of whether the nonmarketable order is posted or canceled, the process stops at step 110 as indicated.

Returning to step 106, if the incoming buy order is greater than or equal to the NBO, then the order is marketable, and the process continues to step 112. At step 112, the process checks whether the posting market center 20 is at the NBO or not. If the posting market center 20 is not at the NBO, then the process must route the incoming buy order to the away market center or market centers at the NBO, as indicated at step 114. If the buy order still has quantity remaining after it has routed, then the process continues to step 130. (Alternatively, if the buy order cannot be routed due to its order type, then the order is typically either canceled or else repriced less aggressively and processing stops).

Returning to step 112, if, on the other hand, the posting market center is at the NBO, then the incoming buy order can match one or more sell orders resting on the posting market center 20. The process retrieves the best (lowest-priced) sell order on the posting market center order book, as indicated at step 116.

At step 118, the process compares the firm identifier (FirmID) of the incoming buy order to the firm identifier (FirmID) of the retrieved sell order. If the firm identifiers are not the same, then the incoming buy order and retrieved sell order execute against each other, as indicated at step 128. If the process determines at step 130 that the incoming buy order still has quantity remaining to trade after the match, then the process returns to step 104 where it repeats the procedure described above to determine if the incoming buy order can continue to trade within the AI restriction rules.

Returning to step 118, if the firm identifiers are the same, then the process continues to step 120. At step 120, the process applies the rules previously explained for determining whether an order carrying an AI Flag should be cancelled. Specifically, the process checks to see if the incoming buy order has an AI Flag set to Yes. If the buy order is flagged not to trade with orders from the same firm, then the buy order is canceled at step 122 because the incoming buy order and the retrieved sell order are from the same firm and the incoming buy order has the more recent timestamp. The process then stops for this buy order as indicated at step 132.

Referring back to step 120, if the process determines that the incoming buy order is not restricted as to interacting with sell orders from the same firm (i.e., the AI Flag on the buy order is not set, or else is set to No), then the process proceeds to step 124, where it checks to see if the retrieved sell order has an AI Flag set to Yes. If the retrieved sell order is flagged not to trade with buy orders from the same firm, then the retrieved sell order is canceled at step 126, in accordance with the rules previously explained for the cancellation of an order if it carries the AI Flag set to Yes. If, however, at step 124, the process determines that the retrieved sell order is not restricted against trading with orders from the same firm (i.e., the AI Flag on the sell order is not set, or else is set to No), then the process proceeds to step 128, where it matches the incoming buy order with the retrieved sell order.

At step 130, the process checks if the incoming buy order Leaves quantity is greater than zero. If it is not, then the incoming buy order has been completely filled, and the process stops as indicated at step 132. On the other hand, if the buy order still has quantity available to trade, then the process returns to step 104, where it repeats the process of determining whether the incoming buy order can trade within the AI restriction rules, as described above.

Figure 3:
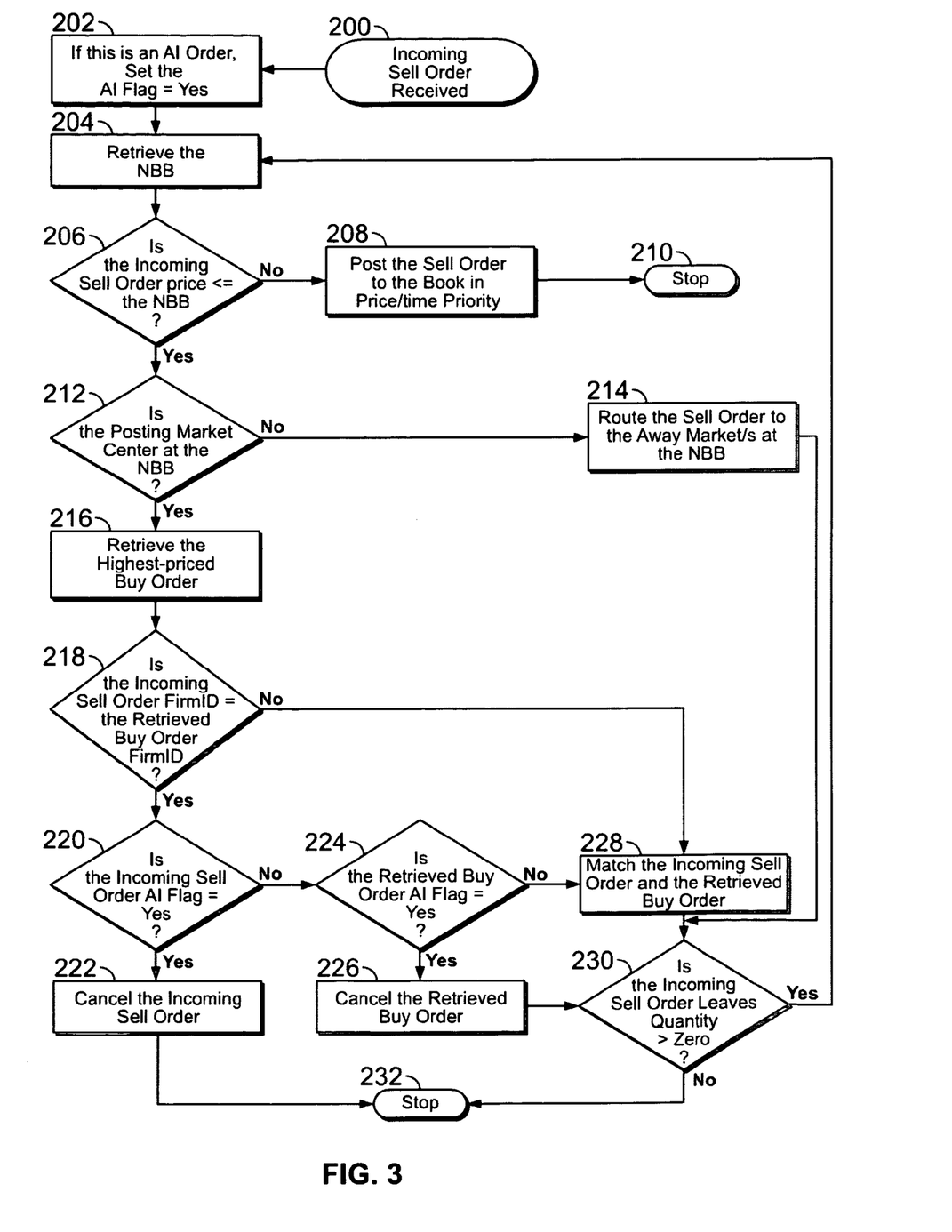
FIG. 3 is a flow diagram illustrating a process implemented by an embodiment of the present invention to process an incoming sell order differently according to whether it is an anti-internalization order or not.

Setting an Anti-Internalization Flag for an Incoming Sell Order and Determining if the Order is Marketable Referring to FIG. 3, the processes for handling an incoming sell order are very similar to the processes described above for handling an incoming buy order. FIG. 3 illustrates the process implemented by the order matching engine 21 where a trader 26 sends a sell order to the posting market center 20. At step 200, a new sell order is received by the order matching engine 21. If the trader 26 does not want this sell order to trade "internally" (i.e., against a buy order from the same firm), then at step 202, the process sets the AI Flag="Yes" on the incoming sell order in accordance with the sending firm's instructions. Next, the process retrieves the national best bid (NBB) at step 204, for the purpose of determining if the incoming sell order is marketable. At step 206, the process compares the price of the incoming sell order to the NBB. If the price of the incoming sell order is greater than the NBB, then the order is not marketable, and the process continues to step 208, where it posts the sell order to the Book in price/time priority. (Alternatively, if the sell order cannot be posted because it must execute immediately, e.g., an 10C order, then the order is canceled instead). Regardless of whether the nonmarketable order is posted or canceled, the process stops at step 210 as indicated.

Returning to step 206, if the incoming sell order is less than or equal to the NBB, then the order is marketable, and the process continues to step 212. At step 212, the process checks whether the posting market center 20 is at the NBB or not. If the posting market center 20 is not at the NBB, then the process must route the incoming sell order to the away market center or market centers at the NBB, as indicated at step 214. If the sell order still has quantity remaining after it has routed, then the process continues to step 230. (Alternatively, if the sell order cannot be routed due to its order type, then the order is typically either canceled or else repriced less aggressively and processing stops).

Returning to step 212, if, on the other hand, the posting market center is at the NBB, then the incoming sell order can match one or more buy orders resting on the posting market center 20. The process retrieves the best (highest-priced) buy order on the posting market center order book, as indicated at step 216.

At step 218, the process compares the firm identifier (FirmID) of the incoming sell order to the firm identifier (FirmID) of the retrieved buy order. If the firm identifiers are not the same, then the incoming sell order and retrieved buy order execute against each other, as indicated at step 228. If the process determines at step 230 that the incoming sell order still has quantity remaining to trade after the match, then the process returns to step 204 where it repeats the process described above to determine if the incoming sell order can continue to trade within the AI restriction rules.

Returning to step 218, if, on the other hand, the firm identifiers are the same, the process continues to step 220. At step 220, the process applies the rules previously explained for determining whether an order carrying an AI Flag should be cancelled. Specifically, the process checks to see if the incoming sell order has an AI Flag set to Yes. If the sell order is flagged not to trade with orders from the same firm, then the sell order is canceled at step 222 because the incoming sell order and the retrieved buy order are from the same firm and the incoming sell order has the more recent timestamp. The process then stops for this sell order as indicated at step 232.

Referring back to step 220, if the process determines that the incoming sell order is not restricted as to interacting with buy orders from the same firm (i.e., the AI Flag on the sell order is not set, or else is set to No), then the process proceeds to step 224, where it checks to see if the retrieved buy order has an AI Flag set to Yes. If the retrieved buy order is flagged not to trade with sell orders from the same firm, then the retrieved buy order is canceled at step 226, in accordance with the rules previously explained for the cancellation of an order if it carries the AI Flag set to Yes. If, however, at step 224, the process determines that the retrieved buy order is not restricted against trading with orders from the same firm (i.e., the AI Flag on the buy order is not set, or else is set to No), then the process proceeds to step 228, where it matches the incoming sell order with the retrieved buy order.

At step 230, the process checks if the incoming sell order Leaves quantity is greater than zero. If it is not, then the incoming sell order has been completely filled, and the process stops as indicated at step 232. On the other hand, if the sell order still has quantity available to trade, then the process returns to step 204, where it repeats the process of determining whether the incoming sell order can trade within the AI restriction rules, as described above.

Examples of how orders carrying the AI Flag=Yes ("AI Orders") operate are provided below. It should be understood that the order prices and market prices discussed in these examples are by way of example only to illustrate how the process of an embodiment of the invention handles AI Orders.

Example 1

Non-Marketable AI Limit Sell Order is Posted

At the start of the examples that follow, the internal order book of a posting market center appears as indicated below. In the examples that follow, the Best Bid and Offer (BBO) from an away market center (MarketA) are also included in the internal Book for purposes of illustration. However, the orders in the following examples will not route to the away market center, as routing for AI Orders is no different from routing for non-AI orders.

The NBBO is $23.05 to $24.00 (500×800). The internal Book looks like this:

| Bids | Offers |
| --- | --- |
| Order A: Buy 500 @ 23.05 | Order C: Sell 800 @ 24.00 |
| FirmID = ABCD | FirmID = ABCD |
| Order B: Buy 400 @ 23.02 | MarketA: Offer 300 @ 24.01 |
| FirmID = EFGH | |
| MarketA: Bid 600 @ 23.02 | |

As all posted orders in the following examples are fully displayed, they are also aggregated at each price level and disseminated to the public order book of the posting market center 20. For example, the posting market center public order book presently looks like this:

| Bids | Offers |
| --- | --- |
| Posting Market Center 500 @ 23.05 | Posting Market Center 800 @ 24.00 |
| Posting Market Center 400 @ 23.02 | |

The posting market center 20 receives the following incoming order:

Order D: Sell 600 @ 23.95, FirmID=ABCD, AI Flag=Yes

Referring to FIG. 3, the process receives the incoming order at step 200 and sets the AI Flag equal to Yes for the order at step 202. The process then retrieves the NBB at step 204, and compares the price of incoming Sell Order D ($23.95) to the NBB ($23.05) at step 206. As Sell Order D's price is higher than the NBB, the order is not marketable. The process continues to step 208, where it posts incoming Sell Order D to the Books (the internal book and the public book) according to price/time priority and processing is completed, as indicated at 210.

The NBBO is now $23.05 to $23.95 (500×600). The internal book looks like this:

| Bids | Offers |
| --- | --- |
| Order A: Buy 500 @ 23.05 | Order D: Sell 600 @ 23.95 ← |
| FirmID = ABCD | FirmID = ABCD, AI Flag = Yes |
| Order B: Buy 400 @ 23.02 | Order C: Sell 800 @ 24.00 |
| FirmID = EFGH | FirmID = ABCD |
| MarketA: Bid 600 @ 23.02 | MarketA: Offer 300 @ 24.01 |

The public order book looks like this:

| Bids | Offers |
| --- | --- |
| Posting Market Center 500 @ 23.05 | Posting Market Center 600 @ 23.95 ← |
| Posting Market Center 400 @ 23.02 | Posting Market Center 800 @ 24.00 |

Example 2

Marketable AI Market Buy Order from a Different Firm Executes

In this example, the posting market center 20 receives the following order:

Order E: Buy 200 @ Market, FirmID=IJKL, AI Flag=Yes

Referring to FIG. 2, the process receives the incoming order at step 100 and sets the AI Flag equal to Yes for the order at step 102. The process then retrieves the NBO at step 104, and compares the price of incoming Buy Order E (Market) to the NBO ($23.95) at step 106. As Market Orders are marketable by definition, the process continues to step 112, where it checks whether the posting market center 20 is at the NBO or not. As Sell Order D ($23.95) is at the NBO ($23.95), the process continues to step 116, where it retrieves the lowest-priced sell order, Order D.

The process then continues to step 118, where it compares the FirmID of incoming Buy Order E (IJKL) to the FirmID of retrieved Sell Order D (ABCD). As the FirmIDs are not the same, there would be no "internalization" and the process is able to trade incoming Buy Order E with 200 shares of posted Sell Order D at the price of $23.95 at step 128. The process then checks to see if incoming Buy Order E has any additional shares available at step 130 and, in this example, determines that the order is completely filled. No further processing is required as indicated at 132.

Sell Order D still has 400 shares remaining, and the internal book looks like this:

| Bids | Offers |
|---|---|
| Order A: Buy 500 @ 23.05 | Order D: Sell 400 @ 23.95 ← |
| FirmID = ABCD | FirmID = ABCD, AI Flag = Yes |
| Order B: Buy 400 @ 23.02 | Order C: Sell 800 @ 24.00 |
| FirmID = EFGH | FirmID = ABCD |
| MarketA: Bid 600 @ 23.02 | MarketA: Offer 300 @ 24.01 |

The public order book looks like this:

| Bids | Offers |
|---|---|
| Posting Market Center 500 @ 23.05 | Posting Market Center 400 @ 23.95 ← |
| Posting Market Center 400 @ 23.02 | Posting Market Center 800 @ 24.00 |

Example 3

Marketable Limit AI Buy Order from the Same Firm is Canceled

In this example, the posting market center 20 receives the following order:

Order F: Buy 700 @ 23.97, FirmID=ABCD, AI Flag=Yes

Referring to FIG. 2, the process receives the incoming order at step 100 and sets the AI Flag equal to Yes for the order at step 102. The process then retrieves the NBO at step 104, and compares the price of incoming Buy Order F ($23.97) to the NBO ($23.95) at step 106. As incoming Buy Order F's price is greater than the NBO, the process continues to step 112, where it checks whether the posting market center 20 is at the NBO or not. As Sell Order D ($23.95) is still at the NBO ($23.95), the process continues to step 116, where it retrieves the lowest-priced sell order, Order D.

The process then continues to step 118, where it compares the FirmID of incoming Buy Order F (ABCD) to the FirmID of retrieved Sell Order D (ABCD). In this example, the FirmIDs are the same. The process then checks to see if the AI Flag on incoming Buy Order F is set to Yes at step 120. The AI Flag in this example is set to Yes. As the AI Flag=Yes on incoming Buy Order F, the process cancels incoming Buy Order F at step 122 and processing is completed as indicated at step 132.

As a matter of note, although the AI Flag on posted Sell Order D is also set to Yes, the order is not canceled. When the process encounters two AI Orders from the same firm, it cancels the order with the most recent timestamp in this embodiment. Since incoming Buy Order F has a more recent timestamp than posted Sell Order D, the process cancels incoming Buy Order F.

The internal book remains unchanged and still looks like this:

| Bids | Offers |
|---|---|
| Order A: Buy 500 @ 23.05 | Order D: Sell 400 @ 23.95 |
| FirmID = ABCD | FirmID = ABCD, AI Flag = Yes |
| Order B: Buy 400 @ 23.02 | Order C: Sell 800 @ 24.00 |
| FirmID = EFGH | FirmID = ABCD |
| MarketA: Bid 600 @ 23.02 | MarketA: Offer 300 @ 24.01 |

The public order book remains unchanged and still looks like this:

| Bids | Offers |
|---|---|
| Posting Market Center 500 @ 23.05 | Posting Market Center 400 @ 23.95 |
| Posting Market Center 400 @ 23.02 | Posting Market Center 800 @ 24.00 |

Example 4

Marketable Non-AI Limit Buy Order from the Same Firm is Received Causing Posted Sell Order to be Canceled In this example, the posting market center 20 receives the following order (the same as in Example 3 except that this order does not carry the AI Flag):

Order G: Buy 700 @ 23.97, FirmID=ABCD

As in Example 3, the process receives the incoming order at step 100. However, as Buy Order G is not an AI Order, the process does not set the AI Flag equal to Yes for the order at step 102. The process then retrieves the NBO at step 104, and compares the price of incoming Buy Order G ($23.97) to the NBO ($23.95) at step 106. As incoming Buy Order G's price is greater than the NBO, the process continues to step 112, where it checks whether the posting market center 20 is at the NBO or not. As Sell Order D ($23.95) is still at the NBO ($23.95), the process continues to step 116, where it retrieves the lowest-priced sell order, Order D.

The process then continues to step 118, where it compares the FirmID of incoming Buy Order G (ABCD) to the FirmID of retrieved Sell Order D (ABCD). In this example, the FirmIDs are the same. The process then checks to see if the AI Flag on incoming Buy Order G is set to Yes at step 120. The AI Flag in this example is not set to Yes. As the AI Flag is not set to Yes on incoming Buy Order G, the process proceeds to step 124, where it checks to see if the AI Flag on retrieved Sell Order D is set to Yes.

The process, in this example, determines that the AI Flag parameter for posted Sell Order D is set to Yes. So, the process, in turn, cancels posted Sell Order D as indicated at step 126. This is an example of the rule that when the process has two orders from the same firm and only one order is an AI Order, the AI Order must be canceled.

The NBBO is now $23.05 to $24.00 (500×800). The internal book momentarily looks like this after Sell Order D is removed:

| Bids | Offers |
| --- | --- |
| Order A: Buy 500 @ 23.05<br>FirmID = ABCD<br>Order B: Buy 400 @ 23.02<br>FirmID = EFGH<br>MarketA: Bid 600 @ 23.02 | Order C: Sell 800 @ 24.00<br>FirmID = ABCD<br>MarketA: Offer 300 @ 24.01 |

The public order book momentarily looks like this:

| Bids | Offers |
| --- | --- |
| Posting Market Center 500 @ 23.05 | Posting Market Center 800 @ 24.00 ← |
| Posting Market Center 400 @ 23.02 | |

Since incoming Buy Order G was not canceled, the process determines that it still has 700 shares available to trade at step 130, and the process returns to step 104. At step 104, the process retrieves the NBO to determine if Buy Order G is still marketable. The process then, as before, compares the price of incoming Buy Order G ($23.97) to the new NBO ($24.00) and determines that Buy Order G's price is lower. As such, incoming Buy Order G is not marketable, and the 700 shares of incoming Buy Order G are posted to the Books in price/time priority at step 108. Processing of Buy Order G is complete as indicated at step 110.

The NBBO is now $23.97 to $24.00 (700×800). The internal book now looks like this with Order G included:

| Bids | Offers |
| --- | --- |
| Order G: Buy 700 @ 23.97 ←<br>FirmID = ABCD<br>Order A: Buy 500 @ 23.05<br>FirmID = ABCD<br>Order B: Buy 400 @ 23.02<br>FirmID = EFGH<br>MarketA: Bid 600 @ 23.02 | Order C: Sell 800 @ 24.00<br>FirmID = ABCD<br>MarketA: Offer 300 @ 24.01 |

The public order book now looks like this:

| Bids | Offers |
| --- | --- |
| Posting Market Center 700 @ 23.97 ← | Posting Market Center 800 @ 24.00 |
| Posting Market Center 500 @ 23.05 | |
| Posting Market Center 400 @ 23.02 | |

Example 5

Nonmarketable AI Limit Sell is Posted (Price is Changed in Later Example)

In this example, the posting market center 20 receives the following order:
Order I: Sell 400@ 24.00, FirmID=ABCD, AI Flag=Yes
Referring to FIG. 3, the process receives the incoming order at step 200, and sets the AI Flag equal to "Yes" for the order at step 202. The process retrieves the NBB at step 204 to determine if incoming Sell Order I is marketable. At step 206, it compares the price of incoming Sell Order I ($24.00) to the NBB ($23.97). As the order price is higher, the process then proceeds to post incoming Sell Order I to the Books according to price/time priority at step 208, and the process stops at step 210.

The internal book looks like this:

| Bids | Offers |
| --- | --- |
| Order G: Buy 700 @ 23.97<br>FirmID = ABCD<br>Order A: Buy 500 @ 23.05<br>FirmID = ABCD<br>Order B: Buy 400 @ 23.02<br>FirmID = EFGH<br>MarketA: Bid 600 @ 23.02 | Order C: Sell 800 @ 24.00<br>FirmID = ABCD<br>Order I: Sell 400 @ 24.00 ←<br>FirmID = ABCD, AI Flag = Yes<br>MarketA: Offer 300 @ 24.01 |

The public order book looks like this (as shown in this example, orders are aggregated at each price level without regard to the AI Flag):

| Bids | Offers |
| --- | --- |
| Posting Market Center 700 @ 23.97 | Posting Market Center 1200 @ 24.00 ← |
| Posting Market Center 500 @ 23.05 | |
| Posting Market Center 400 @ 23.02 | |

Example 6

Nonmarketable AI Limit Buy is Posted

The posting market center 20 receives the following order:
Order J: Buy 300 @ 23.99, FirmID=ABCD, AI Flag=Yes
Referring to FIG. 2, the process receives the incoming order at step 100 and sets the AI Flag equal to "Yes" for the order at step 102. The process then proceeds to retrieve the NBO at step 104, and at step 106, it compares the price of incoming Buy Order J ($23.99) to the NBO ($24.00). As the order price is lower, the process, therefore, posts incoming Buy Order J to the Books in price/time priority at step 108, and processing is complete, as indicated at step 110.

The NBBO is $23.99 to $24.00 (300×1200). The internal book looks like this:

| Bids | Offers |
| --- | --- |
| Order J: Buy 300 @ 23.99 ←<br>FirmID = ABCD, AI Flag = Yes<br>Order G: Buy 700 @ 23.97<br>FirmID = ABCD<br>Order A: Buy 500 @ 23.05<br>FirmID = ABCD<br>Order B: Buy 400 @ 23.02<br>FirmID = EFGH<br>MarketA: Bid 600 @ 23.02 | Order C: Sell 800 @ 24.00<br>FirmID = ABCD<br>Order I: Sell 400 @ 24.00<br>FirmID = ABCD, AI Flag = Yes<br>MarketA: Offer 300 @ 24.01 |

The public order book looks like this:

| Bids | Offers |
| --- | --- |
| Posting Market Center 300 @ 23.99 ← | Posting Market Center 1200 @ 24.00 |
| Posting Market Center 700 @ 23.97 | |
| Posting Market Center 500 @ 23.05 | |
| Posting Market Center 400 @ 23.02 | |

Example 7

Posted AI Sell Order Price is Modified to be Marketable

In this example, the posting market center 20 receives the following request to change the price of posted Sell Order I:

Cancel/Replace Sell Order I: Sell 400 @ 23.99, FirmID=ABCD, AI Flag=Yes

The process, as a result, retrieves Sell Order I (Sell 400 @ 24.00) and changes it to Sell 400 @ 23.99 instead. Note that Sell Order I is still an AI Order. Whenever the order matching engine 21 receives a price change for an order, it treats the order as if it were newly received. It updates the timestamp of the modified order, and immediately checks to see if the order is now marketable at its new price, as if it were an incoming order.

The process in this example retrieves the NBB at step 204 in FIG. 3. At step 206, it compares the price of newly-priced Sell Order I ($23.99) to the NBB ($23.99). As the prices are equal, Sell Order I is marketable. At step 212, the process checks to see if the posting market center 20 is at the NBB. As Buy Order J ($23.99) is posted at the NBB, the process retrieves Buy Order J.

As the order prices are marketable against each other, the process compares the FirmID on newly-priced Sell Order I (ABCD) to the FirmID on Buy Order J (ABCD) at step 218. The FirmIDs are the same, so the process, at step 220, checks whether the AI Flag=Yes on newly-priced Sell Order I. It is in this case. The process, as a result, cancels Sell Order I at step 222 and removes it from the Book. The process, in this regard, enforces the rule that when two AI Orders are from the same firm, the one with the most recent timestamp must be canceled. Although Sell Order I was originally received by the posting market center 20 before Buy Order J was received, Order J has the priority timestamp now because Order J was canceled/replaced and re-priced. Whenever an order is re-priced, its timestamp is updated as if it were a new order. Since Sell Order I has the more recent timestamp, the process cancels Sell Order I and processing is completed as indicated at step 232. Buy Order J remains posted on the Book.

The internal book looks like this after Sell Order I is removed:

| Bids | Offers |
|---|---|
| Order J: Buy 300 @ 23.99 | Order C: Sell 800 @ 24.00 |
| FirmID = ABCD, AI Flag = Yes | FirmID = ABCD |
| Order G: Buy 700 @ 23.97 | MarketA: Offer 300 @ 24.01 |
| FirmID = ABCD | |
| Order A: Buy 500 @ 23.05 | |
| FirmID = ABCD | |
| Order B: Buy 400 @ 23.02 | |
| FirmID = EFGH | |
| MarketA: Bid 600 @ 23.02 | |

The public order book looks like this:

| Bids | Offers |
|---|---|
| Posting Market Center 300 @ 23.99 | Posting Market Center 800 @ 24.00 ← |
| Posting Market Center 700 @ 23.97 | |
| Posting Market Center 500 @ 23.05 | |
| Posting Market Center 400 @ 23.02 | |

Example 8

AI Market Sell Order Trades First and the Remainder is Canceled

The posting market center 20 receives the following order:

Order K: Sell 2000 @ Market, FirmID=EFGH, AI Flag=Yes

Referring to FIG. 3, the process receives the incoming order at step 200 and sets the AI Flag equal to "Yes" for the order at step 202. The process then retrieves the NBB at step 204, and compares the price of incoming Sell Order K (Market) to the NBB ($23.99) at step 206. As Market Orders are marketable by definition, the process continues to step 212, where it checks whether the posting market center 20 is at the NBB or not. As Buy Order J ($23.99) is at the NBB ($23.99), the process continues to step 216, where it retrieves the highest-priced buy order, Order J.

The process then continues to step 218, where it compares the FirmID of incoming Sell Order K (EFGH) to the FirmID of retrieved Buy Order J (ABCD). As the FirmIDs are not the same, there would be no "internalization" even though both orders are AI Orders, and the process is able to trade incoming Sell Order K with 300 shares of posted Buy Order J at the price of $23.99 at step 228. Buy Order J is completely depleted, and removed from the Book.

The NBBO is now $23.97 to $24.00 (700×800). The internal book looks like this after Buy Order J is removed:

| Bids | Offers |
|---|---|
| Order G: Buy 700 @ 23.97 | Order C: Sell 800 @ 24.00 |
| FirmID = ABCD | FirmID = ABCD |
| Order A: Buy 500 @ 23.05 | MarketA: Offer 300 @ 24.01 |
| FirmID = ABCD | |
| Order B: Buy 400 @ 23.02 | |
| FirmID = EFGH | |
| MarketA: Bid 600 @ 23.02 | |

The public order book looks like this:

| Bids | Offers |
|---|---|
| Posting Market Center 700 @ 23.97 ← | Posting Market Center 800 @ 24.00 |
| Posting Market Center 500 @ 23.05 | |
| Posting Market Center 400 @ 23.02 | |

The process then checks to see if incoming Sell Order K has any additional shares available at step 230 and, in this example, determines that the order still has 1700 shares available. The process returns to step 204, where it repeats the procedure just described for determining if incoming Sell Order K can continue to trade within the AI restriction rules.

The process retrieves the NBB again at step 204, and compares the price of incoming Sell Order K (Market) to the new NBB ($23.97) at step 206. As Market Orders are marketable by definition, the process continues to step 212, where it checks whether the posting market center 20 is at the NBB or not. As Buy Order G ($23.97) is at the NBB ($23.97), the process continues to step 216, where it retrieves the highest-priced buy order, Order G.

The process then continues to step 218, where it compares the FirmID of incoming Sell Order K (EFGH) to the FirmID of retrieved Buy Order G (ABCD). As the FirmIDs are not the same, there would be no "internalization" and the process is able to trade incoming Sell Order K with 700 shares of posted Buy Order G at the price of $23.97 at step 228. Buy Order G is completely depleted, and removed from the Book.

The NBBO is now $23.05 to $24.00 (500×800). The internal book looks like this after Buy Order G is removed:

| Bids | Offers |
|---|---|
| Order A: Buy 500 @ 23.05 | Order C: Sell 800 @ 24.00 |
| FirmID = ABCD | FirmID = ABCD |
| Order B: Buy 400 @ 23.02 | MarketA: Offer 300 @ 24.01 |
| FirmID = EFGH | |
| MarketA: Bid 600 @ 23.02 | |

The public order book looks like this:

| Bids | Offers |
|---|---|
| Posting Market Center 500 @ 23.05 ← | Posting Market Center 800 @ 24.00 |
| Posting Market Center 400 @ 23.02 | |

The process then checks to see if incoming Sell Order K has any additional shares available at step 230 and, in this example, determines that the order still has 1000 shares available. The process returns to step 204, where it repeats the procedure just described for determining if incoming Sell Order K can continue to trade within the AI restriction rules.

The process retrieves the new NBB at step 204, and compares the price of incoming Sell Order K (Market) to the NBB ($23.05) at step 206. As Market Orders are marketable by definition, the process continues to step 212, where it checks whether the posting market center 20 is at the NBB or not. As Buy Order A ($23.05) is at the NBB ($23.05), the process continues to step 216, where it retrieves the highest-priced buy order, Order A.

The process then continues to step 218, where it compares the FirmID of incoming Sell Order K (EFGH) to the FirmID of retrieved Buy Order A (ABCD). As the FirmIDs are not the same, there would be no "internalization" and the process is able to trade incoming Sell Order K with 500 shares of posted Buy Order A at the price of $23.05 at step 228. Buy Order A is completely depleted, and removed from the Books.

The NBBO is now $23.02 to $24.00 (400×800). The internal book looks like this after Buy Order A is removed:

| Bids | Offers |
|---|---|
| Order B: Buy 400 @ 23.02 | Order C: Sell 800 @ 24.00 |
| FirmID = EFGH | FirmID = ABCD |
| MarketA: Bid 600 @ 23.02 | MarketA: Offer 300 @ 24.01 |

The public order book looks like this:

| Bids | Offers |
|---|---|
| Posting Market Center 400 @ 23.02 ← | Posting Market Center 800 @ 24.00 |

The process then checks to see if incoming Sell Order K has any additional shares available at step 230 and, in this example, determines that the order still has 500 shares available. The process returns to step 204, where it repeats the procedure just described for determining if incoming Sell Order K can continue to trade within the AI restriction rules.

The process retrieves the new NBB at step 204, and compares the price of incoming-Sell Order K (Market) to the NBB ($23.02) at step 206. As Market Orders are marketable by definition, the process continues to step 212, where it checks whether the posting market center 20 is at the NBB or not. As Buy Order B ($23.02) is at the NBB ($23.02), the process continues to step 216, where it retrieves the highest-priced buy order, Order B.

The process then continues to step 218, where it compares the FirmID of incoming Sell Order K (EFGH) to the FirmID of retrieved Buy Order B (EFGH). The FirmIDs are the same in this example. Incoming Sell Order K and posted Buy Order B both have FirmID=EFGH. Then, at step 220, the process determines that incoming Sell Order K has AI Flag=Yes. Therefore, the process enforces the rule that when two orders are from the same firm and one has an AI Flag=Yes, it cancels the AI Order. Incoming Sell Order K, therefore, is canceled at step 222 and processing is complete as indicated at step 232. Buy Order B remains posted to the Books.

The internal book and the public order book remain unchanged.

Example 9

Marketable AI Order Cannot Interact with a Market Maker Quote on an Options Market Center, and is Canceled The examples that follow next illustrate an implementation of how AI Orders trade on an embodiment of the present invention in an options marketplace. AI Orders for option issues follow the same rules illustrated in the previous examples for AI Orders for equity issues, i.e., an AI Order may not execute against another order from the same firm. If a posting market center 20 supports Market Makers 31, then AI rules may also optionally be extended to include restrictions against incoming AI orders matching with Market Maker quotes 33 from the same firm. Traders 26 and Market Makers 31 can be from the same order sending firm. When a Market Maker 31 sends an order (as opposed to a quote) to the posting market center 20, that Market Maker 31 is logically treated as if it were a trader 26 in this implementation of the invention.

In the examples that follow, the posting market center 20 has appointed Market Makers 31 in some issues. When an appointed Market Maker is the Lead Market Maker in the issue, then that Market Maker is guaranteed participation with incoming orders in accordance with the business rules of the posting market center. By way of example, some of those business rules are implemented in a process referred to as the "Lead Market Maker Guarantee Process" in this document.

It should be understood that the Lead Market Maker Guarantee Process described below is subject to change and serves only to illustrate the matching rules for Market Maker quotes in relation to incoming AI Orders of the present invention when sent to the posting market center 20, and that a broader discussion of Market Maker rules, responsibilities, and entitlements is beyond the scope of this document. For the purposes of these examples, the issue has a Lead Market Maker ("LMM"), and if the Lead Market Maker is quoting at the NBBO at the time an incoming marketable order is received, the Lead Market Maker is guaranteed participation with the incoming order after customer orders with price/time priority ahead of the Lead Market Maker's Quote have been satisfied first. As the business rules for the Lead Market Maker Guarantee Process may be implemented differently, it should be understood that the purpose of these examples is not to illustrate Market Maker Guarantees, it is to illustrate whether incoming AI Orders can match with Market Maker Quotes or not. The invention is in no way limited to the embodiments used below for illustration purposes. It should be noted again that the posting market center 20 may not have appointed Market Makers in all issues. It should also be noted that orders automatically generated on behalf of Market Maker quotes cannot have the AI Flag in this implementation and, therefore, a Market Maker quote, and its automatically generated order, are never canceled due to AI restrictions.

At the start of this example, the NBBO is $2.00 to $2.10 (40×70). This issue has two assigned Market Makers: Lead Market Maker "LMM" from Firm EFGH, and regular Market Maker "MM2" from Firm ABCD. Firms ABCD, EFGH, and IJKL presently have customer orders posted to the Order Book. Order N is an AI Order.

In the following examples, the away market best bids and offers from data structure 25 are included with the Market Maker quotes from data structure 33 in a combined internal Quote Book. The BBO from Away Market Center A (MarketA) is shown here for illustration purposes but will not participate in the examples, as the routing of AI Orders is no different from the routing of non-AI orders. The combined internal Quote Book looks like this:

| Bids | Offers |
| --- | --- |
| LMM: Bid 40 @ 2.00 | LMM: Offer 40 @ 2.10 |
| FirmID = EFGH | FirmID = EFGH |
| MM2: Bid 30 @ 1.90 | MM2: Offer 30 @ 2.15 |
| FirmID = ABCD | FirmID = ABCD |
| MarketA: Bid 50 @ 1.90 | MarketA: Offer 20 @ 2.15 |

The internal Order Book looks like this:

| Buy Orders | Sell Orders |
| --- | --- |
| Order L: Buy 10 @ 1.95 | Order N: Sell 30 @ 2.10 |
| FirmID = EFGH | FirmID = ABCD, AI Flag = Yes |
| Order M: Buy 20 @ 1.85 | Order O: Sell 30 @ 2.20 |
| FirmID = IJKL | FirmID = EFGH |

The posting market center's public book, which aggregates Market Maker quotes and displayed orders at each price level, looks like this:

| Bids | Offers |
| --- | --- |
| Posting Market Center 40 @ 2.00 | Posting Market Center 70 @ 2.10 |
| Posting Market Center 10 @ 1.95 | Posting Market Center 30 @ 2.15 |
| Posting Market Center 30 @ 1.90 | Posting Market Center 30 @ 2.20 |
| Posting Market Center 20 @ 1.85 | |

The posting market center 20 receives the following order:
Order P: Sell 100 @ 1.85, FirmID=EFGH, AI Flag=Yes Whenever the internal matching engine 21 determines that a Market Maker Quote is marketable against an incoming order, it automatically generates an order on behalf of the quote. As Market Maker LMM is bidding at the NBB in this example, LMM is entitled to execute with incoming Sell Order P in the Lead Market Maker Guarantee Process. However, as incoming Sell Order P is an AI Order sent by Firm EFGH, it cannot execute against the LMM bid, which is also from Firm EFGH. In accordance with the rule that stipulates that when a buy order and a sell order have the same FirmID, the AI Order must be canceled, in this example, incoming Sell Order P is canceled immediately. The AI restriction against "internalization" trumps any guaranteed trading privileges for Lead Market Makers in this embodiment of the invention.

FIG. 3 illustrates this process. Specifically, an incoming order is received at step 200, and the process sets the AI Flag equal to Yes for the order at step 202. The process then retrieves the NBB at step 204, and compares the price of incoming Sell Order P ($1.85) to the NBB ($2.00) at step 206. As incoming Sell Order P's price is lower than the NBB, the process continues to step 212, where it checks whether the posting market center 20 is at the NBB or not. As the LMM Bid ($2.00) is at the NBB ($2.00), the process continues to step 216, where it retrieves the highest-priced buy order. As the LMM Bid is at the NBB, the order matching engine 21 automatically generates a buy order on its behalf.

The process then continues to step 218, where it compares the FirmID of incoming Sell Order P (EFGH) to the FirmID of the order generated on behalf of the LMM Bid (EFGH). In this example, the FirmIDs are the same. The process then checks to see if the AI Flag on incoming Sell Order P is set to Yes at step 220. The AI Flag in this example is set to Yes. As the AI Flag=Yes on incoming Sell Order P, the process cancels incoming Sell Order P at step 222 and processing is completed as indicated at step 232. The LMM Bid does not execute, the quote continues to be disseminated, and the buy order generated on its behalf is immediately killed.

The combined internal Quote Book remains unchanged and still looks like this:

| Bids | Offers |
| --- | --- |
| LMM: Bid 40 @ 2.00 | LMM: Offer 40 @ 2.10 |
| FirmID = EFGH | FirmID = EFGH |
| MM2: Bid 30 @ 1.90 | MM2: Offer 30 @ 2.15 |
| FirmID = ABCD | FirmID = ABCD |
| MarketA: Bid 50 @ 1.90 | MarketA: Offer 20 @ 2.15 |

The internal Order Book remains unchanged and still looks like this: Buy Orders Sell Orders

| Buy Orders | Sell Orders |
| --- | --- |
| Order L: Buy 10 @ 1.95 | Order N: Sell 30 @ 2.10 |
| FirmID = EFGH | FirmID = ABCD, AI Flag = Yes |
| Order M: Buy 20 @ 1.85 | Order O: Sell 30 @ 2.20 |
| FirmID = IJKL | FirmID = EFGH |

The posting market center's public book remains unchanged and still looks like this:

| Bids | Offers |
| --- | --- |
| Posting Market Center 40 @ 2.00 | Posting Market Center 70 @ 2.10 |
| Posting Market Center 10 @ 1.95 | Posting Market Center 30 @ 2.15 |
| Posting Market Center 30 @ 1.90 | Posting Market Center 30 @ 2.20 |
| Posting Market Center 20 @ 1.85 | |

Example 10

Marketable AI Order Interacts with a Market Maker Quote and a Posted Order, and the Remainder is Canceled The posting market center 20 receives the following order:
Order Q: Sell 100 @ 1.85, FirmID=ABCD, AI Flag=Yes As Market Maker LMM is still bidding at the NBB in this example, LMM is entitled to execute with incoming Sell Order Q in the Lead Market Maker Guarantee Process. Although incoming Sell Order Q is an AI Order, it was sent by Firm ABCD, and is therefore eligible to execute against the LMM bid from Firm EFGH, unlike previous AI Sell Order P.

Whenever the internal matching engine 21 determines that a Market Maker Quote is marketable against an incoming order, it automatically generates an order on behalf of the quote. In this example, the Lead Market Maker is guaranteed execution of up to 40% of the Leaves quantity of an incoming order, after that order has first satisfied any displayed Customer orders with price/time priority. As customer Orders L and M have prices that are inferior to the LMM bid of $2.00 ($1.95 and $1.85, respectively), they do not have price/time priority. As such, the LMM bid is entitled to trade immediately with incoming Sell Order Q in this example.

FIG. 3 illustrates this process. Specifically, an incoming order is received at step 200, and the process sets the AI Flag equal to Yes for the order at step 202. The process then retrieves the NBB at step 204 and compares the price of incoming Sell Order Q ($1.85) to the NBB (still $2.00) at step 206. As incoming Sell Order Q's price is lower than the NBB, the process continues to step 212, where it checks whether the posting market center 20 is at the NBB or not. As the LMM Bid ($2.00) is still at the NBB ($2.00), the process continues to step 216, where it retrieves the highest-priced buy order. As the LMM Bid is at the NBB, the order matching engine 21 automatically generates a buy order on its behalf.

The process then continues to step 218, where it compares the FirmID of incoming Sell Order Q (ABCD) to the FirmID of the order generated on behalf of the LMM Bid (EFGH). In this example, the FirmIDs are not the same. The process then executes 40 contracts of incoming Sell Order Q at the price of $2.00 against the buy order automatically generated on behalf of the LMM Bid in the Lead Market Maker Guarantee Process. LMM moves its bid from $2.00 to $1.90.

The NBBO is now $1.95 to $2.10 (10×70).

The combined internal Quote Book looks like this after LMM moves its bid:

| Bids | Offers |
| --- | --- |
| MM2: Bid 30 @ 1.90 | LMM: Offer 40 @ 2.10 |
| FirmID = ABCD | FirmID = EFGH |
| LMM: Bid 40 @ 1.90 ← | MM2: Offer 30 @ 2.15 |
| FirmID = EFGH | FirmID = ABCD |
| MarketA: Bid 50 @ 1.90 | MarketA: Offer 20 @ 2.15 |

The internal Order Book remains unchanged and still looks like this:

| Buy Orders | Sell Orders |
| --- | --- |
| Order L: Buy 10 @ 1.95 | Order N: Sell 30 @ 2.10 |
| FirmID = EFGH | FirmID = ABCD, AI Flag = Yes |
| Order M: Buy 20 @ 1.85 | Order O: Sell 30 @ 2.20 |
| FirmID = IJKL | FirmID = EFGH |

The posting market center's public book now looks like this:

| Bids | Offers |
| --- | --- |
| Posting Market Center 10 @ 1.95 ← | Posting Market Center 70 @ 2.10 |
| Posting Market Center 70 @ 1.90 ← | Posting Market Center 30 @ 2.15 |
| Posting Market Center 20 @ 1.85 | Posting Market Center 30 @ 2.20 |

The process determines that incoming Sell Order Q still has 60 contracts available to trade. It returns to step 204 to see if incoming Sell Order Q can continue to trade within the AI restriction rules.

At step 204, the process retrieves the NBB, and at step 206, it compares the price of incoming Sell Order Q ($1.85) to the new NBB ($1.95). As incoming Sell Order Q is priced lower, the process continues to step 212, where it checks if the posting market center 20 is at the NBB. As posted Buy Order L ($1.95) is at the NBB ($1.95), it is retrieved at step 216.

As the orders are marketable against each other, the process compares the FirmID on incoming Sell Order Q (ABCD) to the FirmID of retrieved Buy Order L (EFGH) at step 218. As the FirmIDs are different, the process proceeds to step 228, where it matches 10 contracts of incoming Sell Order Q with posted Buy Order L at $1.95, completely filling Buy Order L and removing it from the Order Book.

The NBBO is now $1.90 to $2.10 (120×70).

The combined internal Quote Book remains unchanged and still looks like this:

| Bids | Offers |
| --- | --- |
| MM2: Bid 30 @ 1.90 | LMM: Offer 40 @ 2.10 |
| FirmID = ABCD | FirmID = EFGH |
| LMM: Bid 40 @ 1.90 | MM2: Offer 30 @ 2.15 |
| FirmID = EFGH | FirmID = ABCD |
| MarketA: Bid 50 @ 1.90 | MarketA: Offer 20 @ 2.15 |

The internal Order Book looks like this after Order L is removed:

| Buy Orders | Sell Orders |
| --- | --- |
| Order M: Buy 20 @ 1.85 | Order N: Sell 30 @ 2.10 |
| FirmID = IJKL | FirmID = ABCD, AI Flag = Yes |
|  | Order O: Sell 30 @ 2.20 |
|  | FirmID = EFGH |

The posting market center's public book now looks like this:

| Bids | Offers |
| --- | --- |
| Posting Market Center 70 @ 1.90 ← | Posting Market Center 70 @ 2.10 |
| Posting Market Center 20 @ 1.85 | Posting Market Center 30 @ 2.15 |
|  | Posting Market Center 30 @ 2.20 |

At step 230, the process checks whether incoming Sell Order Q has any remaining quantity to trade, and determines that it still has 50 contracts. The process returns to step 204 to determine if incoming Sell Order Q can continue to trade within the AI restriction rules.

At step 204, the process retrieves the new NBB (now $1.90), and at step 206 it compares the price of incoming Sell Order Q ($1.85) to the NBB ($1.90). As the order price is lower, the process continues to step 212, where it checks whether the posting market center 20 is at the NBB. As the bids from Market Makers MM2 and LMM are both at the NBB, the process continues to step 216, where it retrieves the next best buy order. At the present time, MM2's bid of 30 contracts at $1.90 constitutes the best buying interest, as it has time priority over the LMM bid at the same price. As the MM2 bid is marketable, the order matching engine 21 automatically generates a buy order on its behalf.

At step 218, the process compares the FirmID on incoming Sell Order Q (ABCD) to the FirmID on the buy order generated on behalf of MM2's bid (ABCD). The FirmIDs are the same, so the process, at step 220, checks whether the AI Flag=Yes on incoming Sell Order Q. It is in this case. The process, as a result, cancels the remaining quantity of incoming Sell Order Q at step 222. The process, in this regard, enforces the rule that when two orders are from the same firm, the order with the AI Flag must be canceled. Processing is complete, as indicated at step 232. MM2's bid does not execute, the quote continues to be disseminated, and the buy order generated on its behalf is immediately killed.

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A method comprising:
   (a) providing a market center order book having limit orders posted thereon, wherein the limit orders posted on the market center order book each have a trading firm identifier and system timestamp parameter;
   (b) receiving by a computing system an incoming order having a first trading firm identifier and a first anti-internalization parameter;
   (c) determining by the computing system whether the incoming order is an anti-internalization order;
   (d) responsive to determining that the incoming order is an anti-internalization order, setting the first anti-internalization parameter to active;
   (e) responsive to determining that the incoming order is not an anti-internalization order, setting the first anti-internalization parameter to inactive;
   (f) retrieving by the computing system the best contra-side limit order to the incoming order from the market center order book, wherein the best contra-side limit order has a second anti-internalization parameter and a second trading firm identifier;
   (g) determining by the computing system whether the incoming order is marketable against the best contra-side limit order;
   (h) responsive to determining by the computing system that the incoming order is marketable against the best contra-side limit order:
      (h)(i) determining by the computing system whether both the first and second trading firm identifiers indicate that the incoming and best contra-side limit orders were posted by the same trading firm;
      (h)(ii) responsive to determining that both the first and second trading firm identifiers indicate that the incoming and best contra-side limit orders were posted by the same trading firm:
         (h)(ii)(a) determining by the computing system whether the first and second anti-internalization parameters are set to active;
         (h)(ii)(b) responsive to determining that both the first and second anti-internalization parameters are set to active, cancelling by the computing system the order with the most recently set system timestamp parameter;
         (h)(ii)(c) responsive to determining that both the first and second anti-internalization parameters are set to inactive, matching by the computing system the incoming and best contra-side limit orders;
         (h)(ii)(d) responsive to determining that the first anti-internalization parameter is set to active and the second anti-internalization parameter is set to inactive, cancelling by the computing system the incoming order; and
         (h)(ii)(e) responsive to determining that the second anti-internalization parameter is set to active and the first anti-internalization parameter is set to inactive, cancelling by the computing system the best contra-side limit order.

2. The method of claim 1, wherein the incoming order is a buy order.

3. The method of claim 1, wherein the incoming order is a sell order.

4. The method of claim 1, wherein the method runs at least partially through a market center.

5. The method of claim 4, wherein the market center operates in at least one of an options marketplace or equities marketplace.

6. The method of claim 1, wherein the computing system is one or more programmed computers.

7. The method of claim 1, wherein the computing system is distributed over several physical locations.

8. The method of claim 1, wherein inactive indicates that the best contra-side limit order is available to trade against orders posted by the same trading firm or is not set to indicate that the best contra-side limit order is not available to trade against orders posted by the same trading firm.

9. The method of claim 1, wherein active indicates that the best contra-side limit order is not available to trade against orders posted by the same trading firm.

10. A method comprising:
   (a) providing by a computing system a market center order book having limit orders posted thereon and having published market maker quotes which generate orders, wherein the limit orders posted on the market center order book and published market maker quotes each have a trading firm identifier and system timestamp parameter;
   (b) receiving by the computing system an incoming order having a first trading firm identifier and a first anti-internalization parameter;
   (c) determining by the computing system whether the incoming order is an anti-internalization order;
   (d) responsive to determining that the incoming order is an anti-internalization order, setting the first anti-internalization parameter to active;
   (e) responsive to determining that the incoming order is not an anti-internalization order, setting the first anti-internalization parameter to inactive;
   (f) retrieving by the computing system the best contra-side limit order or quote to the incoming order from the market center order book, wherein the best contra-side limit order or quote has a second anti-internalization parameter and a second trading firm identifier;
   (g) determining by the computing system whether the incoming order is marketable against the best contra-side limit order or quote;

(h) responsive to determining by the computing system that the incoming order is marketable against the best contra-side limit order or quote:
   (h)(i) determining by the computing system whether both the first and second trading firm identifiers indicate that the incoming and best contra-side limit orders or quote were posted by the same trading firm;
   (h)(ii) responsive to determining that both the first and second trading firm identifiers indicate that the incoming and best contra-side limit orders or quote were posted by the same trading firm:
     (h)(ii)(a) determining by the computing system whether the first and second anti-internalization parameters are set to active;
     (h)(ii)(b) responsive to determining that both the first and second anti-internalization parameters are set to active, cancelling by the computing system the order or quote with the most recently set system timestamp parameter;
     (h)(ii)(c) responsive to determining that both the first and second anti-internalization parameters are set to inactive, matching by the computing system the incoming and best contra-side limit orders or quote;
     (h)(ii)(d) responsive to determining that the first anti-internalization parameter is set to active and the second anti-internalization parameter is set to inactive, cancelling by the computing system the incoming order; and
     (h)(ii)(e) responsive to determining that the second anti-internalization parameter is set to active and the first anti-internalization parameter is set to inactive, cancelling by the computing system the best contra-side limit order or quote.

11. The method of claim 10 wherein the incoming order is a buy order.

12. The method of claim 10, wherein the incoming order is a sell order.

13. The method of claim 10, wherein the method runs at least partially through a market center that has a lead market maker and the lead market maker receives guaranteed trading privileges.

14. The method of claim 10, wherein the computing system is one or more programmed computers.

15. The method of claim 10, wherein the computing system is distributed over several physical locations.

16. The method of claim 10, wherein inactive indicates that the best contra-side limit order is available to trade against orders posted by the same trading firm or is not set to indicate that the best contra-side limit order is not available to trade against orders posted by the same trading firm.

17. The method of claim 10, wherein active indicates that the best contra-side limit order is not available to trade against orders posted by the same trading firm.

18. A system comprising:
   (a) a market center order book;
   (b) one or more limit orders posted on the market center order book, wherein the limit orders each have a trading firm identifier and system timestamp parameter;
   (c) at least one interface to a computing system for receiving orders, including anti-internalization orders;
   (d) at least one memory of the computing system for storing program code for processing anti-internalization orders and for storing anti-internalization order parameters
   (e) at least one processor of the computing system for interacting with the interface and executing the stored program code for processing anti-internalization orders when the interface receives an incoming order having a first trading firm identifier and a first anti-internalization parameter, wherein the code, when executed:
   (e)(i) determines whether the incoming order is an anti-internalization order;
   (e)(ii) responsive to determining that the incoming order is an anti-internalization order, sets the first anti-internalization parameter to active;
   (e)(iii) responsive to determining that the incoming order is not an anti-internalization order, sets the first anti-internalization parameter to inactive;
   (e)(iv) retrieves the best contra-side limit order to the incoming order from the market center order book, wherein the best contra-side limit order has a second anti-internalization parameter and a second trading firm identifier;
   (e)(v) determines whether the incoming order is marketable against the best contra-side limit order;
   (e)(vi) responsive to determining that the incoming order is marketable against the best contra-side limit order:
     (e)(vi)(a) determines whether both the first and second identifiers indicate that the incoming and best contra-side limit orders were posted by the same trading firm;
     (e)(vi)(b) responsive to determining that both the first and second identifiers indicate that the incoming and best contra-side limit orders were posted by the same trading firm:
       (e)(vi)(b)(i) determines whether the first and second anti-internalization parameters are set to active;
       (e)(vi)(b)(ii) responsive to determining that both the first and second anti-internalization parameters are set to active, cancels the order with the most recently set system timestamp parameter;
       (e)(vi)(b)(iii) responsive to determining that both the first and second anti-internalization parameters are set to inactive, matches the incoming and best contra-side limit orders;
       (e)(vi)(b)(iv) responsive to determining that the first anti-internalization parameter is set to active and the second anti-internalization parameter is set to inactive, cancels the incoming order; and
       (e)(vi)(b)(v) responsive to determining that the second anti-internalization parameter is set to active and the first anti-internalization parameter is set to inactive, cancels the best contra-side limit order.

19. The system of claim 18, wherein the incoming order is a buy order.

20. The system of claim 18, wherein the incoming order is a sell order.

21. The system of claim 18, wherein the system operates in a market center.

22. The system of claim 21, wherein the market center operates in at least one of an options marketplace or equities marketplace.

23. The system of claim 18, wherein the computing system is one or more programmed computers.

24. The system of claim 18, wherein the computing system is distributed over several physical locations.

25. The system of claim 18, wherein inactive indicates that the best contra-side limit order is available to trade against orders posted by the same trading firm or is not set to indicate that the best contra-side limit order is not available to trade against orders posted by the same trading firm.

26. The system of claim 18, wherein active indicates that the best contra-side limit order is not available to trade against orders posted by the same trading firm.

* * * * *